US008751410B2

(12) United States Patent
Iwaki et al.

(10) Patent No.: US 8,751,410 B2
(45) Date of Patent: Jun. 10, 2014

(54) CHARGING SYSTEM FOR CHARGING FOR IMAGE PROCESSING CONDUCTED BASED ON IMAGE DATA, IMAGE PROCESSING APPARATUS, AND CHARGING PROGRAM EMBODIED ON COMPUTER READABLE MEDIUM

(75) Inventors: Mitsuzo Iwaki, Osaka (JP); Masahiro Kitamura, Osaka (JP); Kenichi Takahashi, Sennan-gun (JP); Daisuke Sakiyama, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1371 days.

(21) Appl. No.: 11/954,058

(22) Filed: Dec. 11, 2007

(65) Prior Publication Data

US 2008/0162172 A1    Jul. 3, 2008

(30) Foreign Application Priority Data

Dec. 28, 2006   (JP) ................................ 2006-356076

(51) Int. Cl.
  *G06F 17/00*  (2006.01)
  *G06Q 10/00*  (2012.01)

(52) U.S. Cl.
  USPC .......................................... 705/400; 705/1.1

(58) Field of Classification Search
  CPC .......... H04N 1/00127; H04N 1/00347; H04N 2201/0039; H04N 2201/0094; G06Q 30/0283; G06Q 30/0206; G06Q 30/04; G06F 3/1237; G06F 3/1238
  USPC ......... 795/7, 8, 9, 11, 20, 22–30, 34, 39, 400, 795/1.1; 235/381, 380
  See application file for complete search history.

(56) References Cited

U.S. PATENT DOCUMENTS 6,771,382 B1    8/2004   Misawa et al.
2002/0013742 A1 *  1/2002   Shiota et al. ................ 705/26

(Continued)

FOREIGN PATENT DOCUMENTS

JP   408102860   *  4/1996
JP   2000-151891    5/2000

(Continued)

OTHER PUBLICATIONS

Notice of Ground of Rejection in JP 2006-356076 dated Nov. 11, 2008, and a English Translation thereof.

(Continued)

*Primary Examiner* — Igor Borissov
(74) *Attorney, Agent, or Firm* — Buchanan Ingersoll Rooney PC

(57) ABSTRACT

In order to charge a proper amount of money to the transmitting source and the destination, an MFP accepts transmitting source specifying information for identifying a transmitting user, destination specifying information for specifying a data destination, specifying of the data, and a processing procedure defining processing executed with respect to the specified data. The MFP acquires apparatus identification information for identifying a destination apparatus corresponding to the destination and capacity information defining processing executable by the destination apparatus. The MFP then compares the processing procedure with acquired restriction information. When the processing defined by the capacity information does not include part of the processing defined by the processing procedure, the MFP charges a processing charge for the data in a divided manner to the transmitting user and the destination user.

22 Claims, 15 Drawing Sheets

(56) References Cited

U.S. PATENT DOCUMENTS

| | | | |
|---|---|---|---|
| 2004/0070781 A1* | 4/2004 | Matsugi | 358/1.14 |
| 2006/0053481 A1* | 3/2006 | Olsen et al. | 726/3 |
| 2006/0177255 A1 | 8/2006 | Mizoi | |
| 2010/0191647 A1* | 7/2010 | Hansen et al. | 705/41 |

FOREIGN PATENT DOCUMENTS

| | | | |
|---|---|---|---|
| JP | 2001-250057 | | 9/2001 |
| JP | 2002-197012 | | 7/2002 |
| JP | 2004258961 | * | 2/2003 |
| JP | 2004272301 | * | 2/2003 |
| JP | 2003-151031 | | 5/2003 |
| JP | 2003151031 | * | 5/2003 |
| JP | 2005085104 | * | 9/2003 |
| JP | 2003-337690 | | 11/2003 |
| JP | 2004-030607 | | 1/2004 |
| JP | 2004030607 | * | 1/2004 |
| JP | 2004-110848 | | 4/2004 |
| JP | 2004280644 | * | 10/2004 |
| JP | 2005-85104 A | | 3/2005 |
| JP | 2005-174224 | | 6/2005 |
| JP | 2005-329682 | | 12/2005 |
| JP | 2006-221436 | | 8/2006 |
| JP | 2006-311020 | | 11/2006 |

OTHER PUBLICATIONS

Notice of Allowance in JP 2006-356076 dated Jun. 9, 2009, and an English Translation thereof.

* cited by examiner

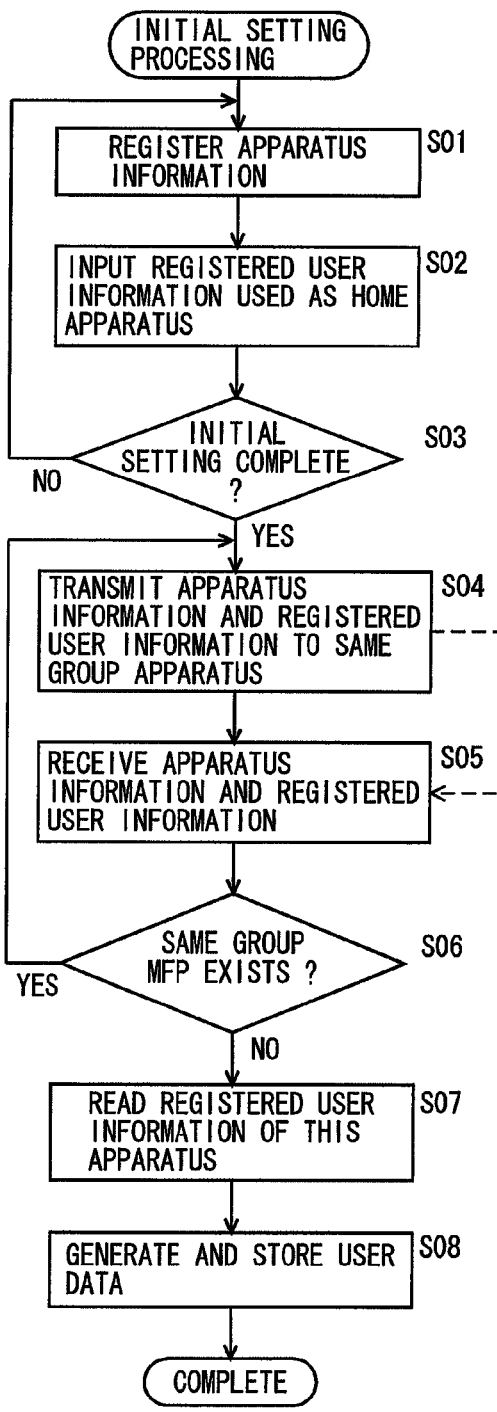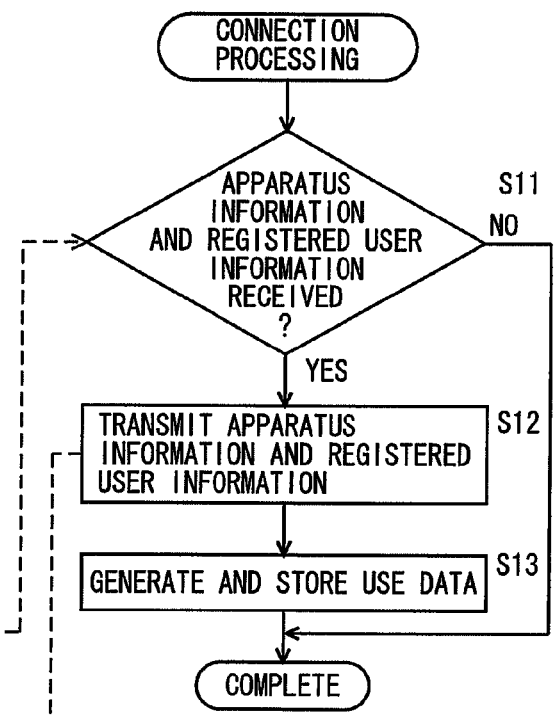
FIG. 3A
FIG. 3B

F I G. 4 A

REGISTERED USER INFORMATION OF MFP 100

| NUMBER | USER IDENTIFICATION INFORMATION | DEPARTMENT NAME | E-mail ADDRESS | FACE IMAGE | PASSWORD | INDIVIDUAL RESTRICTION INFORMATION |
|---|---|---|---|---|---|---|
| 1 | DAVID | SECRETARY ROOM | david@xxx.jp | david.jpg | xxx | RESTRICTION INFORMATION OF DAVID |

F I G. 4 B

REGISTERED USER INFORMATION OF MFP 100A

| NUMBER | USER IDENTIFICATION INFORMATION | DEPARTMENT NAME | E-mail ADDRESS | FACE IMAGE | PASSWORD | INDIVIDUAL RESTRICTION INFORMATION |
|---|---|---|---|---|---|---|
| 1 | JULIE | PLANNING DEPARTMENT | julie@xxx.jp | julie.jpg | xxxx | RESTRICTION INFORMATION OF JULIE |

F I G. 4 C

REGISTERED USER INFORMATION OF MFP 100B

| NUMBER | USER IDENTIFICATION INFORMATION | DEPARTMENT NAME | E-mail ADDRESS | FACE IMAGE | PASSWORD | INDIVIDUAL RESTRICTION INFORMATION |
|---|---|---|---|---|---|---|
| 1 | TED | GENERAL AFFAIRS DEPARTMENT | ted@xxx.jp | ted.jpg | xxxxx | RESTRICTION INFORMATION OF TED |

F I G. 4 D

REGISTERED USER INFORMATION OF MFP 100C

| NUMBER | USER IDENTIFICATION INFORMATION | DEPARTMENT NAME | E-mail ADDRESS | FACE IMAGE | PASSWORD | INDIVIDUAL RESTRICTION INFORMATION |
|---|---|---|---|---|---|---|
| 1 | MICHAEL | DEVELOPMENT DEPARTMENT | michael@xxx.jp | michael.jpg | xxxxx | RESTRICTION INFORMATION OF MICHAEL |
| 2 | SUZAN | RESEARCH DEPARTMENT | susan@xxx.jp | susan.jpg | xxxxxx | RESTRICTION INFORMATION OF SUZAN |

F I G. 4 E

FIRST USER DATA OF MFP 100

| NUMBER | USER IDENTIFICATION INFORMATION | DEPARTMENT NAME | E-mail ADDRESS | FACE IMAGE | PASSWORD | HOME MFP | LOCATION OF HOME TERMINAL |
|---|---|---|---|---|---|---|---|
| 1 | DAVID | SECRETARY ROOM | david@xxx.jp | david.jpg | xxx | IP ADDRESS OF MFP 100 | COPY ROOM ON 19TH FLOOR |
| 2 | JULIE | PLANNING DEPARTMENT | julie@xxx.jp | julie.jpg | xxxx | IP ADDRESS OF MFP 100A | PLANNING DEPARTMENT ON 5TH FLOOR |
| 3 | TED | GENERAL AFFAIRS DEPARTMENT | ted@xxx.jp | ted.jpg | xxxxx | IP ADDRESS OF MFP 100B | MEETING ROOM ON 4TH FLOOR |
| 4 | MICHAEL | DEVELOPMENT DEPARTMENT | michael@xxx.jp | michael.jpg | xxxxx | IP ADDRESS OF MFP 100C | MEETING ROOM ON 14TH FLOOR |
| 5 | SUSAN | RESEARCH DEPARTMENT | susan@xxx.jp | susan.jpg | xxxxxx | IP ADDRESS OF MFP 100C | LABORATORY ON 7TH FLOOR |

F I G. 5

| | INDIVIDUAL RESTRICTION INFORMATION | |
|---|---|---|
| | ITEMS | CONTENTS |
| RESTRICTION INFORMATION OF MICHAEL | UPPER LIMIT FOR MONOCHROME PRINTING (A4) | 100 SHEETS |
| | UPPER LIMIT FOR COLOR PRINTING (A4) | — |
| | THE NUMBER OF PAPER SHEETS PRINTED IN MONOCHROME (A4) | 50 SHEETS |
| | DUPLEX AVAILABILITY | UNAVAILABLE |
| | ⋮ | ⋮ |
| RESTRICTION INFORMATION OF SUZAN | UPPER LIMIT FOR MONOCHROME PRINTING (A4) | UNLIMITED |
| | UPPER LIMIT FOR COLOR PRINTING (A4) | — |
| | THE NUMBER OF PAPER SHEETS PRINTED IN MONOCHROME (A4) | 80 SHEETS |
| | DUPLEX AVAILABILITY | AVAILABLE |
| | ⋮ | ⋮ |

FIG. 11

CAPACITY INFORMATION OF MFP 100A

| ITEMS | DEVICE SPECIFICATION |
|---|---|
| COLOR | IN MONOCHROME |
| PRINT SIZE | A4·A5·B5 |
| RESOLUTION | 300dpi |
| PRINT RATE (PER MIN.) | 45 SHEETS |
| DUPLEX PRINTING | AVAILABLE |
| STAPLE | UNAVAILABLE |
| : | : |

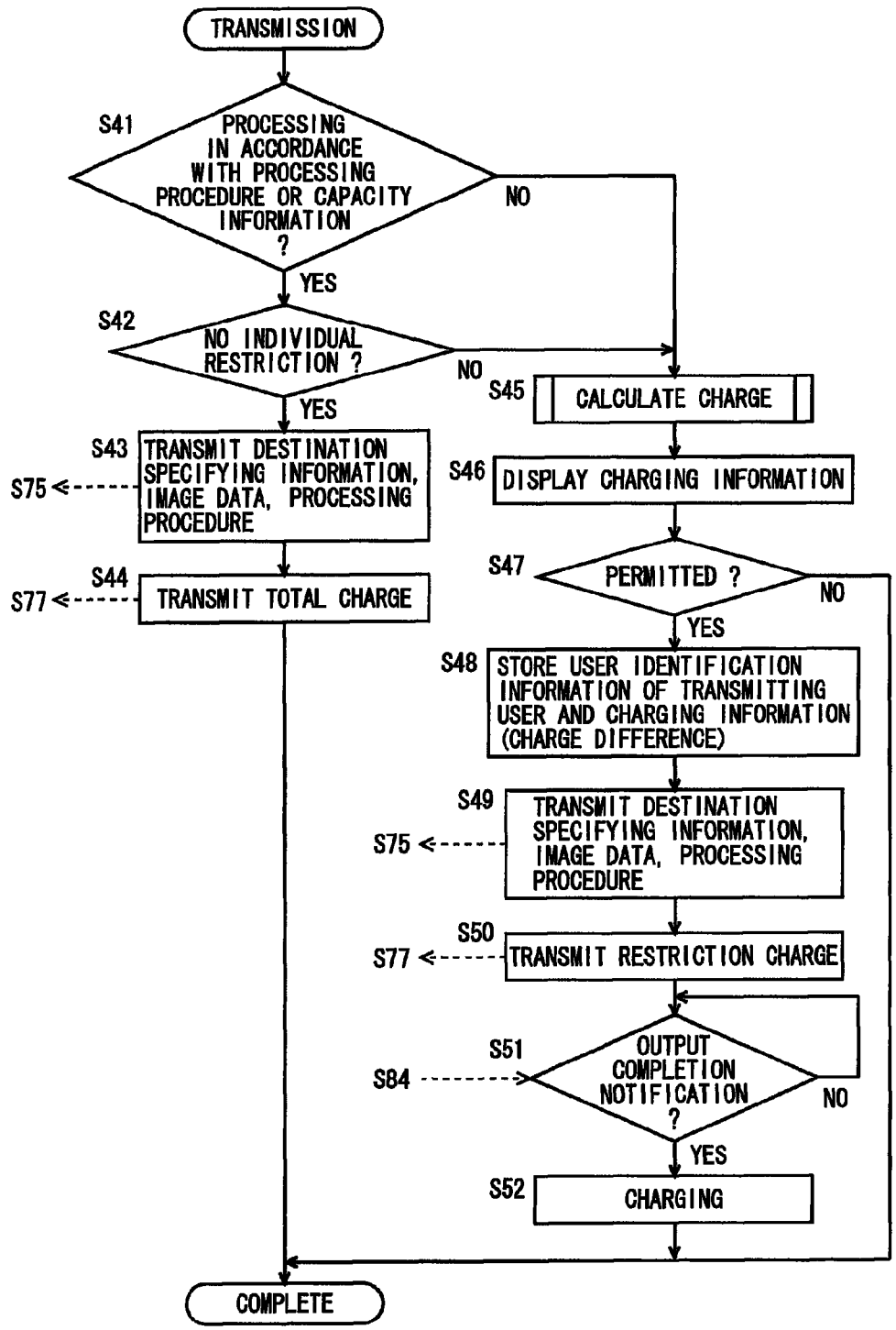

F I G. 1 3
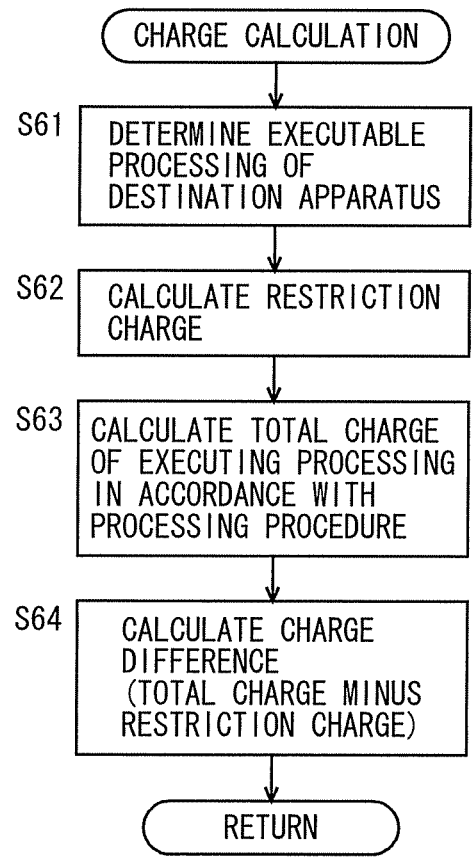

FIG. 14

CHARGE TABLE

| COLOR TYPE \ PAPER SIZE | A5 | B5 | A4 | B4 | A3 |
|---|---|---|---|---|---|
| MONOCHROME | 20 | | 30 | | 50 |
| COLOR | 30 | | 50 | | 80 |

FIG. 15

| RECEIVING SIDE | RECOMMENDED CONDITION | CHARGE TO TRANSMITTING SOURCE | |
|---|---|---|---|
| IN MONOCHROME A4 | IN COLOR A3 | CHARGE | 80yens |
| | | CHARGE DIFFERENCE | 50yens |
| | | OK | CANCEL |

CHARGING SYSTEM FOR CHARGING FOR IMAGE PROCESSING CONDUCTED BASED ON IMAGE DATA, IMAGE PROCESSING APPARATUS, AND CHARGING PROGRAM EMBODIED ON COMPUTER READABLE MEDIUM

This application is based on Japanese Patent Application No. 2006-356076 filed with Japan Patent Office on Dec. 28, 2006, the entire content of which is hereby incorporated by reference.

BACKGROUND OF THE INVENTION

1. Field of the Invention

The present invention relates to a charging system, an image processing apparatus, and a charging program embodied on a computer readable medium, and more particularly, to a charging system for charging for image processing conducted based on image data, an image processing apparatus, and a charging program embodied on a computer readable medium.

2. Description of the Related Art

In recent years, a technique has been developed to transfer image data between users by using image processing apparatuses such as scanners, printers, and facsimiles. For example, image data is handed over from a user to a destination user by storage in the hard disc, file transfer, or electronic mail, and the destination user outputs the image data by printing. However, outputting the image data by printing involves an amount of money charged for the printing, and the destination user ends up being charged. Japanese Laid-Open Publication No. 2005-85104 describes a technique such that when the person receiving data outputs data by printing, either the transmitting user or the destination user is charged for the printing.

However, there may be a difference in processing capacity between the image processing apparatus operated by the data transmitting user and the image processing apparatus operated by the data destination user. For example, when the transmitting user transmits data in color while the apparatus used by the destination user deals with data in monochrome, the data in color ends up being printed in monochrome, making impossible the color printing of the data as intended by the destination user. In this case, either the destination user or the transmitting user is charged for the monochrome printing, which is problematic in that the charging is only for the monochrome printing while the transmitting user has instructed that a color image be printed. Still, charging either the transmitting user or the destination user for color printing, which is costly, results in dissatisfaction for the transmitting user since the transmitting user is heavily charged while the intended color image cannot be output, or for the destination user since the destination user is heavily charged while only monochrome printing of the image is available.

SUMMARY OF THE INVENTION

The present invention is made to solve the aforementioned problems. An object of the present invention to provide a charging system capable of charging a proper amount of money to the transmitting source and the destination, an image processing apparatus, and a charging program embodied on a computer readable medium.

In order to achieve the aforementioned objects, according to an aspect of the present invention, a charging system includes: a transmitting source accepting portion to accept transmitting source specifying information for specifying a transmitting user; a destination accepting portion to accept destination specifying information for specifying a user as a destination of data; a specifying portion to accept specifying of the data; a procedure accepting portion to accept a processing procedure defining processing executed with respect to the specified data; an apparatus determining portion to acquire apparatus identification information for identifying a destination apparatus corresponding to the destination; a restriction information acquiring portion to acquire capacity information defining processing executable by the destination apparatus; and a charging portion to, when the processing defined by the capacity information does not include part of the processing defined by the processing procedure, execute charging processing such that a processing charge for the data is charged in a divided manner to the transmitting user and the destination user.

According to this aspect, a charging system capable of charging a proper amount of money to the transmitting source and the destination is provided.

According to another aspect of the present invention, an image processing apparatus includes: a transmitting source accepting portion to accept transmitting source specifying information for specifying a transmitting user; a destination accepting portion to accept destination specifying information for specifying a user as a destination of data; a specifying portion to accept specifying of the data; a procedure accepting portion to accept a processing procedure defining processing executed with respect to the specified data; an apparatus determining portion to acquire apparatus identification information for identifying a destination apparatus corresponding to the destination; a restriction information acquiring portion to acquire capacity information defining processing executable by the destination apparatus; and a charging portion to, when the processing defined by the capacity information does not include part of the processing defined by the processing procedure, execute charging processing such that a processing charge for the data is charged in a divided manner to the transmitting user and the destination user.

According to this aspect, an image processing apparatus capable of charging a proper amount of money to the transmitting source and the destination is provided.

According to another aspect of the present invention, an image processing apparatus includes: a processing procedure receiving portion to receive from a transmitting apparatus a processing procedure defining processing executed with respect to data and destination specifying information for specifying a user as a destination of the data; a restriction information acquiring portion to acquire capacity information defining processing executable by the restriction information acquiring portion's own apparatus; and a charging portion to, when the processing defined by the capacity information does not include part of the processing defined by the processing procedure, execute charging processing such that a processing charge for the data is charged in a divided manner to the transmitting user and the destination user.

According to this aspect, an image processing apparatus capable of charging a proper amount of money to the transmitting source and the destination is provided.

According to another aspect of the present invention, a charging program embodied on a computer readable medium, the charging program causing a computer to execute steps including: accepting transmitting source specifying information for specifying a transmitting user; accepting destination specifying information for specifying a user as a destination of data; accepting specifying of the data; accepting a processing procedure defining processing executed with respect to the specified data; acquiring apparatus identification information for identifying a destination apparatus corresponding to the destination; acquiring capacity information defining processing executable by the destination apparatus; and executing charging processing such that when the processing defined by the capacity information does not include part of the processing defined by the processing procedure, a processing charge for the data is charged in a divided manner to the transmitting user and the destination user.

According to this aspect, a charging program capable of charging a proper amount of money to the transmitting source and the destination is provided.

According to another aspect of the present invention, a charging program embodied on a computer readable medium, the charging program causing a computer to execute steps including: receiving from a transmitting apparatus a processing procedure defining processing executed with respect to data and destination specifying information for specifying a user as a destination of the data; acquiring capacity information defining processing executable by an apparatus provided with the computer; and executing charging processing such that when the processing defined by the capacity information does not include part of the processing defined by the processing procedure, a processing charge for the data is charged in a divided manner to the transmitting user and the destination user.

According to this aspect, a charging program embodied on a computer readable medium. and capable of charging a proper amount of money to the transmitting source and the destination is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a flowchart showing an example of the flow of initial setting processing, and FIG. 3B is a flowchart showing an example of the flow of connection processing.

FIGS. 4A to 4D are diagrams describing registered user information, and

FIG. 4E is a diagram for describing user data.

FIG. 5 is a diagram showing an example of individual restriction information.

FIG. 11 is a diagram showing an example of capacity information.

FIG. 12 is a diagram showing an example of the flow of transmission processing.

FIG. 13 is a flowchart showing an example of the flow of charge calculation processing.

FIG. 14 is a diagram showing an example of a charge table.

FIG. 15 is a diagram showing an example of a charging information display window.

DESCRIPTION OF THE PREFERRED EMBODIMENTS

Figure 1:
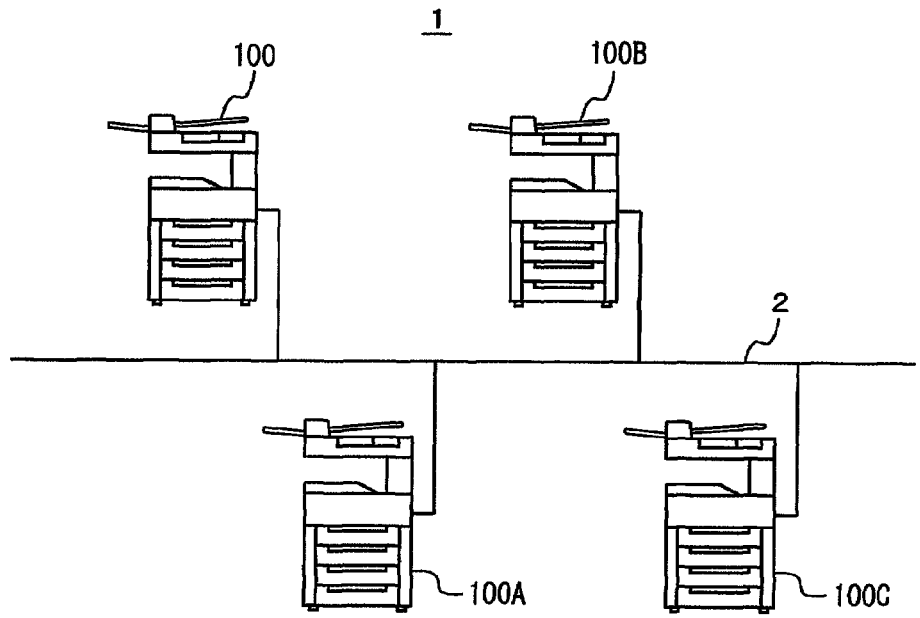
FIG. 1 is a schematic diagram of a charging system according to a first embodiment of the present invention.

Embodiments of the present invention will be described below with referring to the drawings. In the following description, the same or corresponding parts are denoted by the same reference characters. Their names and functions are also the same. Thus, a detailed description thereof will not be repeated.

First Embodiment

FIG. 1 is a schematic diagram of a charging system according to a first embodiment of the present invention. Referring to FIG. 1, a charging system 1 includes multi-function peripherals (hereinafter referred to as MFPs) 100, 100A, 100B, and 100C each connected to a network 2. MFPs 100, 100A, 100B, and 100C have the same structures and functions, and therefore MFP 100 will be taken as an example here unless stated otherwise.

MFP (Multi Functional Peripheral) 100 includes a scanner to read text, an image-forming portion to form, based on image data, an image on a recording medium such as a paper sheet, and a facsimile. MFP 100 is equipped with the image reading function, copying function, and facsimile-transmitting-and-receiving function. While in this embodiment MFP 100 is taken as an example, MFP 100 can be replaced with, for example, a scanner, a printer, a facsimile, and a computer.

Network 2 is a local area network (LAN), and the connection can be either by wire or radio. Also, network 2 is not limited to a LAN and can be a wide area network (WAN), the public switched telephone network (PSTN), the Internet, or the like.

Figure 2:
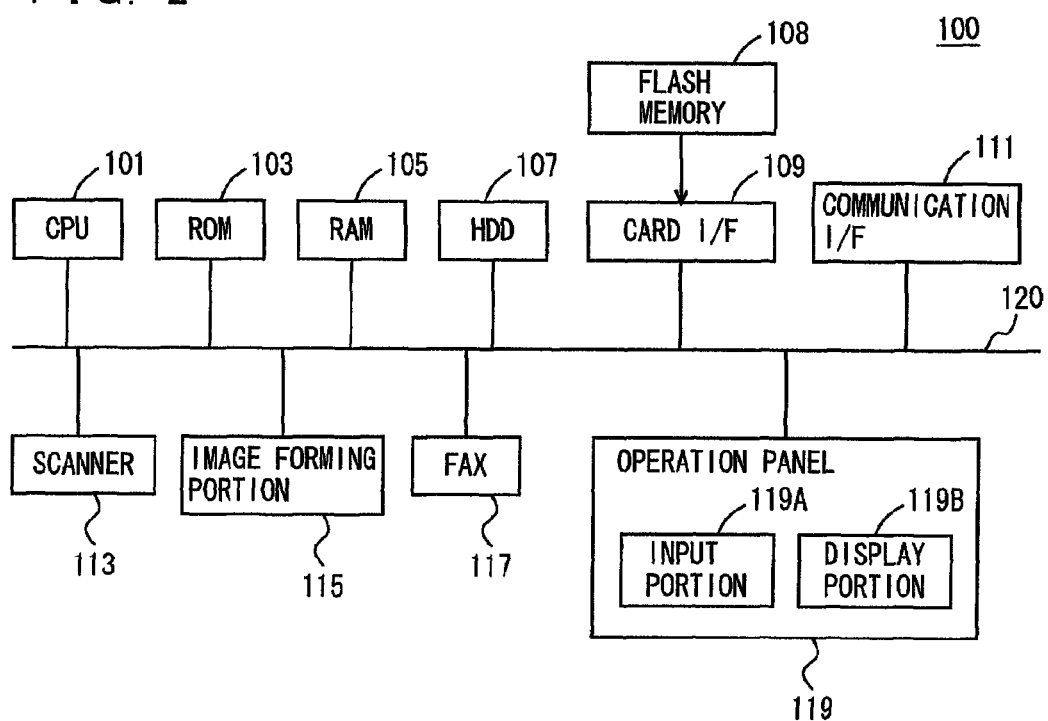
FIG. 2 is a block diagram showing an example of the hardware structure of an MFP according to the first embodiment.

FIG. 2 is a block diagram showing an example of the hardware of MFP 100 according to this embodiment. Referring to FIG. 2, MFP 100 includes, respectively connected to a bus 120, a central processing unit (CPU) 101, a ROM (Read Only Memory) 103 that stores a program or the like to be executed at CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash memory 108 is attached, a communication I/F 111 for connecting MFP 100 to network 2, a scanner 113 to read text and output image data, an image forming portion 115, a facsimile (FAX) 117, and an operation panel 119 as an interface with a user.

CPU 101 loads into RAM 105 and executes a charging program stored in flash memory 108 attached to card I/F 109. Moreover, the charging program executed at CPU 101 is not limited to the charging program stored in flash memory 108, and a charging program stored in an EEPROM (Electrically Erasable/Programmable Read Only Memory) connected additionally to CPU 101 can be loaded into RAM 105 and be executed. The use of an EEPROM makes it possible to rewrite or additionally write a charging program. Thus, a computer connected to network 2 can rewrite the charging program stored in the EEPROM of MFP 100 or additionally write a new charging program into the EEPROM. Furthermore, MFP 100 can download a charging program from a computer connected to network 2 and store the charging program in an EEPROM.

These programs are not limited to the case of being read from flash memory 108 and executed. It can be a program stored in ROM 103 that is read. It is also possible that an EEPROM is connected to CPU 101 and a program read from flash memory 108 is stored in the EEPROM so that the program is read and executed. It is further possible that HDD 107 temporality stores a charging program stored in the flash memory so that the program is loaded from HDD 107 into RAM 105 and executed.

The program referred to here not only includes a program directly executable by CPU 101, but also a program in a source program format, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via the public switched telephone network (PSTN).

Operation portion 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided overlapping with display portion 119B so that an instruction of a button displayed on display portion 119B can be detected. Thus, input of a variety of operations becomes possible.

Communication I/F 111 is a communication interface for connecting MFP 100 to network 2. Thus, it becomes possible for MFP 100 to communicate with the other MFPs 100A, 100B, and 100C. Although MFP 100 is connected to the other MFPs 100A, 100B, and 100C via network 2, it can also be connected directly using a serial interface or a parallel interface. Communication I/F 111 uses an interface that corresponds to the form of connection between MFP 100 and the other MFPs 100A, 100B, and 100C.

The input of data into MFP 100 includes the following cases: (1) when scanner 113 scans a sheet of original manuscript and the image data is inputted; (2) when image data is received from a computer or from any of the other MFPs 100A, 100B, and 100C connected to network 2 via communication I/F 111; (3) when image data stored in flash memory 108 is read via card I/F 109; and (4) when facsimile data is received in FAX 117.

The output of data from MFP 100 includes the following cases: when the data stored in HDD 107 is (1) formed into image onto recording media such as a sheet of paper by the image forming portion 115, (2) transmitted to a computer or to any of the other MFPs 100A, 100B, and 100C connected to network 2 via communication I/F 111, (3) stored in flash memory 108, (4) outputted as facsimile data by FAX 117, and (5) displayed on display portion 119B.

Moreover, storage media that stores data charging program is not limited to flash memory 108 and can also be the media that records a program in a fixed manner, such as a flexible disk, a cassette tape, an optical disk [MO (Magnetic Optical Disc)/MD (Mini Disc)/DVD (Digital Versatile Disc)], an IC card (including a memory card), an optical card, and a semiconductor memory such as a masked ROM, an EPROM, an EEPROM, and the like.

In charging system 1 according to this embodiment, with each of MFPs 100, 100A, 100B, and 100C, a user who mainly uses the apparatus is fixed. Thus, each of MFPs 100, 100A, 100B, and 100C stores registered user information in order to register the user who mainly uses each. The registered user information, which will be described later, includes at least user identification information for identifying a user. The name of the user can be used as the user identification information. Here, based on the user, any one or more of MFPs 100, 100A, 100B, and 100C which store the registered user information of that user are referred to as "home MFPs." For instance, if the registered user information of the user "David" is stored in MFP 100, a home MFP of user "David" is MFP 100. Moreover, registered user information is stored in each of MFPs 100, 100A, 100B, and 100C to define a user who mainly uses the apparatus but not to prohibit a user whose registered user information is not stored therein from using it.

Here, the case in which MFP 100 is connected anew to network 2 where MFPs 100A, 100B, and 100C are already connected is considered. For MFP 100, it is necessary to set apparatus identification information for identifying MFP 100 and the above-described registered user information. When the apparatus identification information and the registered user information are set for MFP 100, then MFP 100 transmits the apparatus identification information and the registered user information to the other MFPs 100A, 100B, and 100C. Thus, a charging system 1 is constructed among MFPs 100, 100A, 100B, and 100C.

FIG. 3A is a flowchart showing an example of the flow of initial setting processing. The initial setting processing is executed in MFP 100 when MFP 100 is newly connected to network 2. FIG. 3B is a flowchart showing an example of the flow of connection processing. The connection processing is executed in each of MFPs 100A, 100B, and 100C when MFP 100 is newly connected to network 2. The initial setting processing and connection processing are implemented when an initial setting program and a connection program stored in flash memory 108 are loaded into RAM 105 and executed at CPU 101 in each of MFPs 100, 100A, 100B, and 100C. The initial setting program and the connection program each are a part of the charging program.

Referring to FIG. 3A, apparatus information is registered in MFP 100 (step S01). When the user inputs the terminal information into operation panel 119 according to the terminal registration window displayed on display portion 119B, the terminal information is accepted and registered in MFP 100. The apparatus information at least includes apparatus identification information for identifying MFP 100. The apparatus identification information is preferably location information assigned to MFP 100 in network 2, and is here an IP (Internet Protocol) address. The apparatus information can include information showing the location where MFP 100 is disposed.

Next, the registered user information of the user who uses MFP 100 as the user's home MFP is inputted into MFP 100 (step S02). When the user inputs the registered user information into operation portion 119 according to the registered user information input window displayed on display portion 119B, the registered user information is accepted and registered in MFP 100. When a plurality of users use MFP 100 as each's home MFP, the registered user information of each of the plurality of users is inputted. The registered user information at least includes user identification information for identifying the user. The user identification information needs only to be unique information such as a user ID including characters or symbols and the name of the user. Here, a user name is used as the user identification information. The registered user information can also include accompanying information and authentication information in addition to the user identification information.

Upon completing the user registration information after the user inputs the apparatus information, the user instructs on a finish button displayed on display portion 119B with input portion 119A so that the completion of the initial setting is detected in MFP 100. Moreover, the registration of the terminal information in step S01 and the input of the registered user information in step S02 are normally performed by an administrator of the terminal.

Then, it is determined whether the initial setting is completed (step S03). If the initial setting is completed, the processing proceeds to step S04, and if it is not completed, the processing goes back to step S01. In step S04, the apparatus information and the registered user information for which initial setting is already performed are transmitted to MFPs in the same group. The same group refers to the set of MFPs which form the charging system 1. Here, MFPs 100, 100A, 100B, and 100C, which are connected to network 2, are considered to be of the same group. Thus, by transmitting an inquiry by broadcast on network 2, MFP 100 receives the IP addresses of terminals respectively transmitted from MFPs 100A, 100B, and 100C in response to the inquiry. In this manner, the IP addresses of MFPs 100A, 100B, and 100C that form the same group are obtained. Moreover, by grouping, a plurality of MFPs 100, 100A, 100B, and 100C, which are connected to network 2, can be divided into different groups. For instance, MFPs 100 and 100A can form one group, while MFPs 100B and 100C can form another group. Such grouping is set by a user. More specifically, as described above, MFP 100 receives the IP addresses of MFPs 100A, 100B, and 100C, which are connected to network 2, and detects MFPs 100A, 100B, and 100C, and the user designates which of MFPs 100A, 100B, and 100C should be in the same group as MFP 100.

MFP 100 transmits apparatus information and registered user information to one MFP selected from MFPs 100A, 100B, and 100C, which are set as the same group. An example is described in which MFP 100A is selected, and the apparatus information and the registered user information of MFP 100 are transmitted from MFP 100 to MFP 100A.

Now, referring to FIG. 3B, MFP 100A receives the apparatus information and the registered user information of MFP 100 transmitted from MFP 100 (step S11). In response to this reception, MFP 100A transmits to MFP 100 the apparatus information and the registered user information stored in HDD 107 of MFP 100A (step S12). That is, the connection processing is executed on condition that MFP 100A receives the apparatus information and the registered user information from MFP 100 executing the initial setting processing. In the next step S13, MFP 100A generates user data from the apparatus information and registered user information of MFP 100 received in step S11. MFP 100A then adds the generated user data to the user data already stored in HDD 107.

Referring back to FIG. 3A, MFP 100 receives the apparatus information and the registered user information of MFP 100A transmitted from MFP 100A (step S05). Then, it is determined whether an MFP to which the apparatus information and the registered user information have not yet been transmitted exists among the MFPs of the same group (step S06). When such an MFP exists, that MFP is selected and the processing goes back to step S04, and otherwise, the processing proceeds to step S07. Here, since the apparatus information and the registered user information are not yet transmitted to MFPs 100B and 100C, either of these two is selected and the processing goes back to step S04. Thus, MFP 100 transmits its apparatus information and registered user information to the MFPs of the same group one by one (step S04), and receives from each MFP the apparatus information and the registered user information of that MFP (step S05). Moreover, although, here, the MFPs of the same group are selected one by one and the apparatus information and the registered user information are transmitted accordingly, the apparatus information and the registered user information can be transmitted by broadcast, and the apparatus information and the registered user information stored in MFPs 100A, 100B, and 100C can be received from MFPs 100A, 100B, and 100C, respectively.

In step S07, the registered user information stored in MFP 100 is read. Then, in step S08, the user data is generated from the apparatus information and the registered user information. User data are generated from the registered user information received from MFPs 100A, 100B, and 100C and the registered user information stored in MFP 100, and from the apparatus information of MFPs 100, 100A, 100B, and 100C. The user data includes a user record composed of items including a number, user identification information, accompanying information, the apparatus information of a home MFP, and the location where the home MFP is disposed. Then the generated user data is stored in HDD 107. When the user data is generated all in MFPs 100, 100A, 100B, and 100C, MFPs 100, 100A, 100B, and 100C store the same user data.

Moreover, here, while the registration of the apparatus information and the input of the registered user information are performed in the initial setting processing executed in MFP 100, similar processing to this initial setting processing is executed in the case where MFP 100 is already connected to network 2 and a user is to be added. In such a case, however, the registration process of the apparatus information of step S01 is not required.

In addition, the initial setting process can be performed not only when MFPs 100, 100A, 100B, and 100C are connected to network 2 but also after the power is turned on for MFPs 100, 100A, 100B, and 100C, or at prescribed time intervals. For instance, when a new user is registered in MFP 100, the registered user information of the newly registered user is transmitted to the other MFPs 100A, 100B, and 100C to allow the other MFPs to store the latest user data. In this case, MFP 100 executes the input processing of the registered user information of step S02 without executing step S01 and step S03 of the initial setting processing shown in FIG. 3A. Contrarily, MFP 100 can obtain the registered user information of a user newly registered in the other MFPs 100A, 100B, and 100C and store the latest user data. In this case, MFP 100 makes a request for transmission of the registered user information to the other MFPs 100A, 100B, and 100C without executing steps S01 to S03 of the initial setting processing shown in FIG. 3A. This transmission request for the registered user information at least includes apparatus identification information. In response to this transmission request, the other MFPs 100A, 100B, and 100C execute the connection processing shown in FIG. 3B, and in step S11 in response to the transmission request received, transmit the registered user information stored in their respective HDDs 107 to MFP 100, which has transmitted the transmission request. Thus, even when the registered user information stored in HDDs 107 of the other MFPs 100A, 100B, and 100C is altered, user data will be generated from the altered registered user information and stored in HDD 107. In this case, there is no need for MFPs 100A, 100B, and 100C to execute step S13 in the connection processing.

FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C. The registered user information includes user identification information, accompanying information, authentication information, and individual restriction information. The accompanying information is the information related to a user, such as the name of the division the user belongs to, an electronic mail address assigned to that user, face image data obtained by photographing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used.

The individual restriction information defines processing, among processing executable by the home apparatus, that is permitted to the user. FIG. 5 is a diagram showing an example of the individual restriction information. FIG. 5 shows the individual restriction information of user identification information "Michael" and "Suzan," who use MFP 100C as their home apparatus. The individual restriction information here includes an upper limit for monochrome printing, an upper limit for color printing, the number of paper sheets printed in monochrome, and duplex printing availability. The upper limit for monochrome printing indicates the maximum possible number of paper sheets printed in monochrome when monochrome printing processing is executed, with 100 sheets for "Michael" and an unlimited number of sheets for "Suzan." The upper limit for color printing indicates the maximum possible number of paper sheets printed in color when color printing processing is executed. Because MFP 100C is an apparatus incapable of executing the color printing processing, the upper limit for color printing is not set both for "Michael" and "Suzan." The number of paper sheets printed in monochrome indicates the number of paper sheets to which monochrome printing is already executed, with 50 sheets for "Michael" and 80 sheets for "Suzan." It can be seen that "Michael" has 50 paper sheets left for monochrome printing processing since the upper limit for monochrome printing for him is 100. The duplex printing availability indicates whether duplex printing processing, which involves forming an image on both surfaces of a paper sheet, is executable. Duplex printing is set to be unexecutable for "Michael" and executable for "Suzan."

Furthermore, FIG. 4E is a diagram showing an example of the user data. The user data is generated and stored in each of MFPs 100, 100A, 100B, and 100C when the initial setting processing shown in FIG. 3A is executed in MFP 100 and the connection processing shown in FIG. 3B is executed in each of MFPs 100A, 100B, and 100C. The user data includes a user record composed of items including a number, the user identification information, accompanying information, the apparatus identification information of a home MFP, and the location where the home MFP is disposed. The user record need only to include at least the items "user identification information" and "the apparatus identification information of a home MFP."

Although an example in which the electronic mail address assigned to a user is saved as accompanying information is illustrated in the above-described embodiment, the accompanying information is not limited to the foregoing, and a telephone number for facsimile transmission, an IP address for the FTP (File Transfer Protocol), or the like can be used. In such cases, information suited for the method of transmission and reception of data would be saved.

In this manner, when the initial setting process is executed in MFP 100, the same user data is generated and stored in MFPs 100, 100A, 100B, and 100C, which are set to be of the same group. Thus, charging system 1 constructed by MFPs 100, 100A, 100B, and 100C is formed. When charging system 1 is formed, the user who uses one of MFPs 100, 100A, 100B, and 100C as the user's home MFP can be specified based on the user data so that data transmission and reception among users can be performed using the user data. The processing executed at MFPs 100, 100A, 100B, and 100C for such data transmission and reception is herein referred to as a job. Moreover, the data transmission and reception performed by execution of such a job is called BOX transmission and reception.

A user inputs a job at one of MFPs 100, 100A, 100B, and 100C in order to transmit image data. Moreover, when job data whose destination is the user himself exists in the home MFP, the user instructs the home MFP to execute the job and thus to output the image data. Hereinafter, an MFP, among MFPs 100, 100A, 100B, and 100C, into which a job is inputted is referred to as a job input MFP, and an MFP, among MFPs 100, 100A, 100B, and 100C, from which a job is outputted is referred to as a job output MFP. Here, to simplify the description, the example will be illustrated in which the user of user identification information "David" inputs at MFP 100 the job of transmitting image data to the destination of user identification information "Julie." In this case, MFP 100 is a job input MFP and executes job input processing. MFP 100 that executes the job input processing executes the processing of authenticating the user in response to a log-in request by the user "David," and thereafter executes job setting processing. Moreover, although the example of executing the job input processing at a home MFP is described here, the job input processing can also be executed at an apparatus other than the home MFP.

Figure 6:
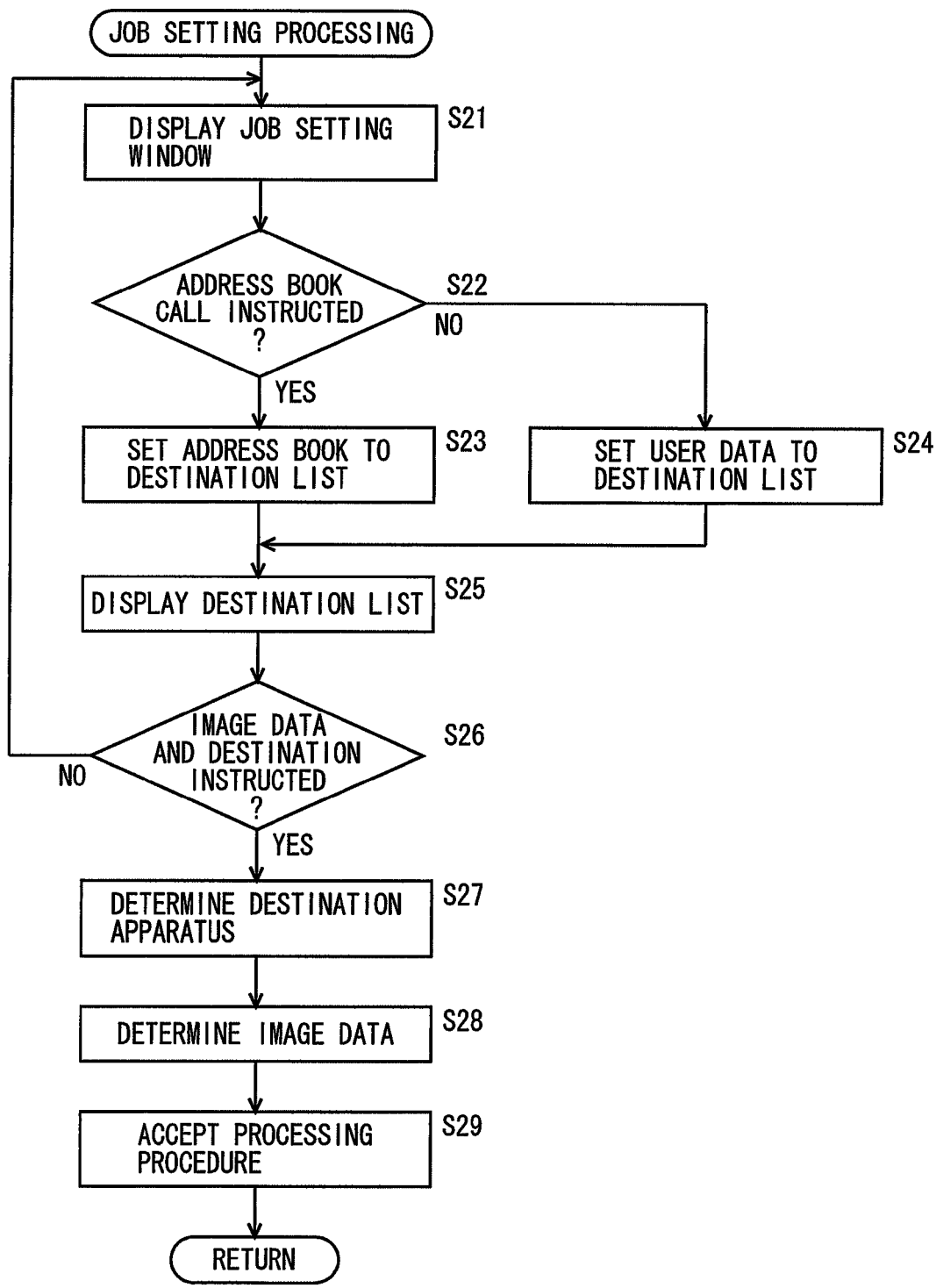
FIG. 6 is a flowchart showing an example of the flow of job setting processing.

FIG. 6 is a flow chart showing an example of the flow of the job setting processing. The job setting processing is implemented by having a job setting program that is stored in flash memory 108 loaded into RAM 105 of MFP 100 and executed at CPU 101. The job setting program is a part of the charging program. Moreover, it is prerequisite that user "David" is logged into MFP 100 prior to the execution of the job setting program. This is for the purpose of allowing MFP 100 to specify the user who operates it.

Referring to FIG. 6, in the job setting processing, a job setting window is displayed by MFP 100 on display portion 119B (step S21). The job setting window is a window for setting data to be transmitted and a destination of the transmission. The job setting window will be described later. Then, it is determined whether a call instruction to call an address book is inputted or not (step S22). If a call instruction is inputted, the processing proceeds to step S23, and if it is not inputted, the processing proceeds to step S24. The address book is unique data of the user that is stored in advance in association with the log-in user, or here, with the user identification information "David." The address book includes at least user identification information and apparatus identification information of a home MFP of that user. The address book can include an electronic mail address. Further, the address book can include a facsimile number. In step S23, the address book is read and is set as a destination list. In step S24, user data is read, and the user data is set as the destination list. In this case, it is not required to generate the destination list anew, and the destination list can be displayed even when an address book does not exist. Then, the destination list is displayed on the job setting window (step S25).

Further, it is determined whether or not the image data to be transmitted and the destination are designated in the job setting window (step S26), and when they are designated, the processing proceeds to step S27, and otherwise, the processing goes back to step S21. The designation of the destination is accepted when the user makes an instruction for the user identification information displayed on the job setting window. When an instruction is made for the user identification information, CPU 101 accepts the instructed user identification information as destination specifying information. The image data to be transmitted is image data to be inputted into MFP 100.

In step S27, a user record including the user identification information accepted as destination specifying information is extracted. Then, the destination apparatus is determined. Specifically, CPU 101 determines apparatus identification information associated with the user identification information by the user record extracted in step S27, the apparatus identification information being determined as apparatus identification information for identifying the destination apparatus (step S27).

In step S28, the image data designated in step S26 is determined as image data to be transmitted to the user corresponding to the destination specifying information designated in step S26. In the next step S29, a processing procedure is accepted. MFP 100 displays a processing procedure setting window on the display portion 119B, and accepts the processing procedure inputted in input portion 119A. The processing procedure setting window is a window for accepting the processing procedure designated by the user of the transmitting source. Then, the accepted processing procedure is determined as the processing procedure of the transmitting source.

Figures 7, 8:
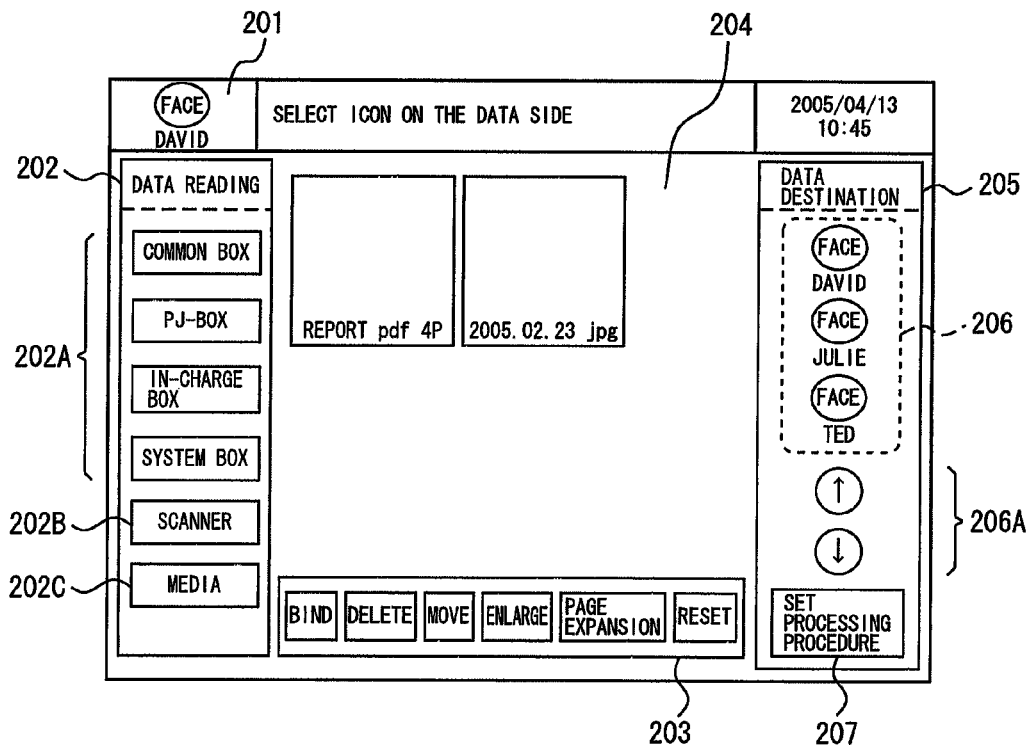
FIG. 7 is a diagram showing an example of a job setting window.
FIG. 8 is a diagram showing an example of a processing procedure setting window.

FIG. 7 is a diagram showing an example of the job setting window. Referring to FIG. 7, a job setting window 200 includes an area 201 for displaying information specifying an operator, an area 202 for accepting an input instruction or a selection instruction of data to be transmitted, an area 203 for instructing edition of data inputted or selected in the area 202, an area 204 for accepting designation of the image data to be transmitted, and an area 205 for accepting designation of the destination of the transmission and the processing procedure.

In area 201, as the information to specify the log-in user "David" who is the operator, the user name "David" as the user identification information and the face image of David are displayed. Moreover, although the characters "FACE" are shown in the diagram for convenience, in practice the face image will be displayed.

Area 202 includes a button 202A for designating an area of HDD 107, a button 202B for instructing input of image data from scanner 113, and a button 202C for instructing input of image data from an image data input device. When button 202A is instructed, a thumbnail that displays in reduction the image data stored in the area of HDD 107 corresponding to that button is displayed in area 204. When button 202B is instructed, scanner 113 is activated and the thumbnail of image data outputted by scanner 113 is displayed in area 204. When button 202C is instructed, image data from the image data input device is inputted, and the thumbnail of the inputted image data is displayed in area 204. The image data input device is, for instance, a computer, an external storing apparatus, and the like connected to network 2.

By the user's instruction on the thumbnail displayed in area 204, the image data corresponding to the instructed thumbnail is designated by MFP 100 as the image data to be the object of transmission. In addition, when the button displayed in area 203 is instructed by the user, such processings as bind processing of putting together a plurality of image data, deletion processing of deleting the image data from the object of selection, move processing for changing the order, processing of enlarging the image data, page development processing of putting together a plurality of image data into one image data, and reset processing of canceling the instructed processing are executed using the image data designated in area 204.

Area 205 is an area for setting the destination and the processing procedure. Area 205 includes an area 206 that displays a destination list for designating the destination, a button 206A for scrolling the display of the destination list, and a button 207 that displays a processing procedure setting window for setting the processing procedure. At least a part of the destination list is displayed in area 206. As the destination list, either of the address book or the user data is set by the above-described job setting processing. The destination list includes at least the user identification information. Thus, the user identification information is displayed in area 206. Moreover, when the destination list includes a face image as accompanying information, that face image is displayed adjacent to the user identification information. Here, although three of the destinations included in the destination list are displayed in area 206, it can be changed to display another destination by the user's instructing on button 206A. By the user's designation of the user identification information, MFP 100 accepts the designated user identification information as destination specifying information for identifying the destination. By the user's instruction on button 207, MFP 100 displays the processing procedure setting window. The processing procedure setting window will be described later.

FIG. 8 is a diagram showing an example of the processing procedure setting window. The processing procedure setting window is displayed on display portion 119B by the user's instruction on button 207 while the job setting window is on display. The processing procedure setting window is a window for setting parameters for forming image data into image. Referring to FIG. 8, the processing procedure setting window includes an area for setting parameters for each of colors, an area for setting parameters for sheet size, and an area for setting parameters for resolution. The parameters for each of colors include an in-color parameter for setting on color printing and an in-monochrome parameter for setting on monochrome printing, one of which being set for printing. Here the case of setting on the in-color parameter is exemplified. The parameters for sheet size are parameters for specifying the size of a paper sheet onto which an image is to be formed, and include parameters for A3, A4, B4, and B5. One of the four parameters is set for printing. Here the case of setting on the A3 parameter is exemplified. The parameters for resolution are parameters for specifying the resolution of an image to be formed, and include 300 dpi, 600 dpi, and 1200 dpi. One of the three parameters is set for printing. Here the case of setting on the 600 dpi is exemplified.

In charging system 1 according to this embodiment, when the transmitting apparatus executes the job input processing, the above-described job setting processing is executed. By the job setting processing, the home MFP of the user specified by the destination information set as the destination is rendered the destination apparatus. The destination information executes job control processing. Here since the user having the user identification information "David" operates the user's home MFP 100 to transmit image data to the user identification information "Suzan," the case where MFP 100 becomes the transmitting source and MFP 100A becomes the destination apparatus will be described.

Figure 9:
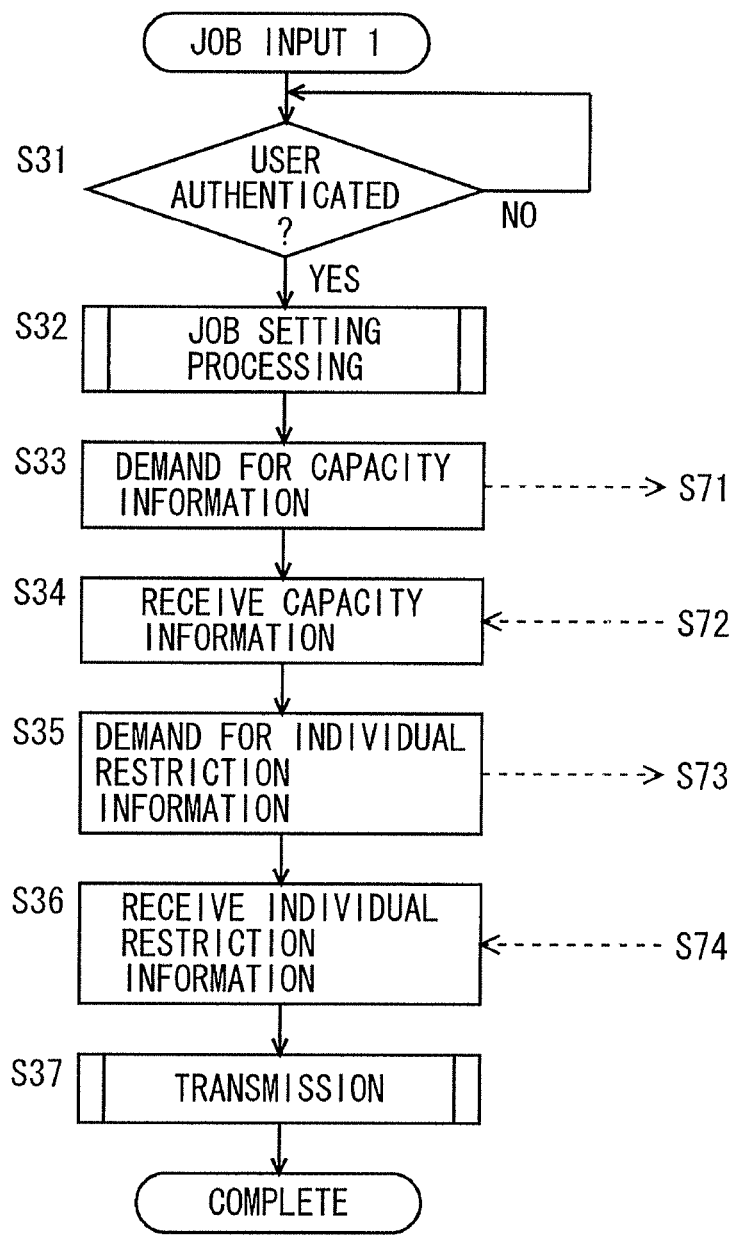
FIG. 9 is a first flowchart showing an example of the flow of job input processing executed by the transmitting apparatus.
Figure 10:
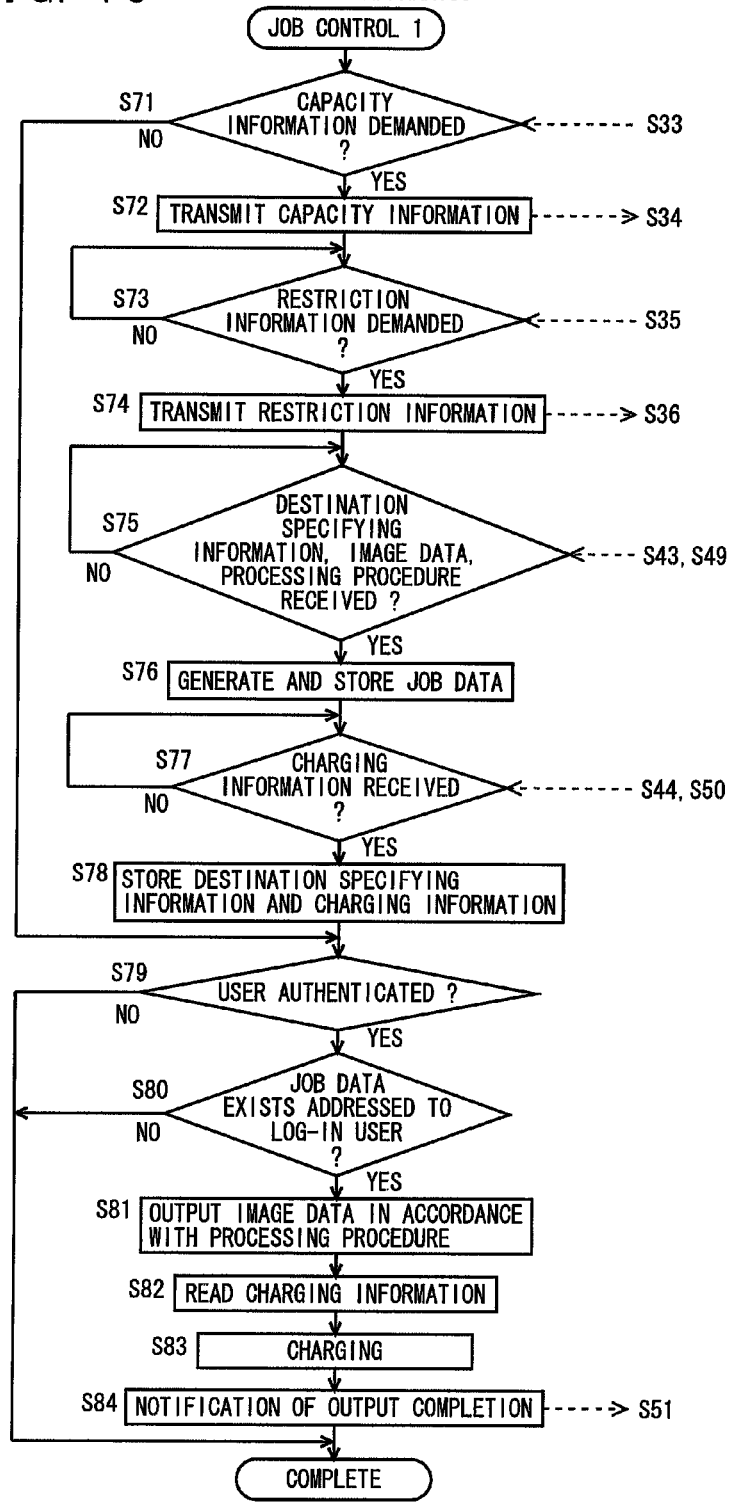
FIG. 10 is a first flowchart showing an example of the flow of job control processing executed by the destination apparatus.

FIG. 9 is a first flowchart showing an example of the flow of the job input processing executed by the transmitting apparatus. The job input processing is implemented by loading a job input program stored in flash memory 108 into RAM 105 of MFP 100, which is the transmitting apparatus, and executing the job input program by CPU 101. The job input program is a part of the charging program. FIG. 10 is a first flowchart showing an example of the flow of the job control processing executed by the destination apparatus. The job control processing is implemented by loading a job control program stored in flash memory 108 into RAM 105 of MFP 100A, which is the destination apparatus, and executing the job control program by CPU 101. The job control program is a part of the charging program.

Referring to FIGS. 9 and 10, MFP 100, which is the job input apparatus, executes user authentication of the user "David" (step S31). When, as a result of the user authentication, the authentication is successful, then log-in is admitted for the user and the processing proceeds to step S32. When the authentication is unsuccessful, log-in is denied for the user and the processing goes back to step S31, with the MFP 100 turning into a stand-by state. MFP 100 admits log-in for the user if user identification information, a password, and the like exists in the user data stored in HDD 107 of MFP 100, and denies log-in for the user if user identification information, a password, and the like does not exist in the user data stored in HDD 107 of MFP 100. As described above, since the user data includes the user identification information included in the registered user information stored in each of the MFPs excluding MFP 100, namely, MFPs 100A, 100B, and 100C, a user who does not use MFP 100 as that user's home MFP can log in MFP 100 insofar as that user uses any of MFPs 100A, 100B, and 100C as that user's home terminal.

In step S32, MFP 100 executes the job setting processing described referring to FIG. 6. After completion of the job setting, the processing proceeds to step S33. Upon completion of the job setting processing, the image data to be transmitted, the destination specifying information (user identification information) and destination apparatus (apparatus identification information), which are the destination of the image data, and the processing procedure are determined.

In step S33, in order to request the destination apparatus to transmit capacity information, MFP 100 transmits to the destination apparatus a signal for requesting transmission of capacity information. The signal for requesting transmission of capacity information is transmitted to the destination apparatus determined in step S32.

MFP 100A, which is the destination apparatus here, judges whether MFP 100A has received the signal for requesting transmission of capacity information (step S71). When the signal is received, the processing proceeds to step S72, and otherwise, the processing proceeds to step S80. In step S72, MFP 100A reads capacity information stored in advance in HDD 107 of MFP 100A and transmits the capacity information to MFP 100, which is the transmitting apparatus here (step S72).

MFP 100, which is the transmitting apparatus here, receives the capacity information from MFP 100A, which is the destination apparatus here (step S34), and the processing proceeds to step S35. In step S35, in order to request the destination apparatus to transmit individual restriction information, MFP 100 transmits to the destination information a signal for requesting transmission of individual restriction information. The signal for requesting transmission of individual restriction information includes the destination specifying information determined in step S32.

MFP 100A, which is the destination apparatus here, is in a stand-by state until reception of the signal for requesting transmission of individual restriction information ("NO" in step S73), and when the signal is received, the processing proceeds to step S74. In step S74, MFP 100A reads individual restriction information, among individual restriction information stored in advance in HDD 107 of MFP 100A, that indicates the user who corresponds to the destination specifying information included in the signal, and transmits the individual restriction information to MFP 100, which is the transmitting apparatus here.

Transmitting apparatus MFP 100 receives the individual restriction information from destination apparatus MFP 100A (step S36), and the processing proceeds to step S37. In step S37, transmitting apparatus MFP 100 executes transmission processing.

FIG. 11 is a diagram showing an example of the capacity information. FIG. 11 shows the capacity information of MFP 100A. Referring to FIG. 11, the capacity information includes items including "color type" for specifying printability in color or monochrome, "print size" for specifying available sizes of paper sheets, "resolution" for specifying the greatest possible resolution, "print rate" (sheet/min) for specifying the maximum number of paper sheets printable per minute, "duplex" for specifying the presence of the duplex printing function, and "stapling" for specifying the presence of the stapling function. Here for MFP 100A, the item "color type" specifies monochrome printing as possible and color printing as impossible, the item "print size" specifies A4, A5, and B5, the item "resolution" specifies 300 dpi, the item "print rate" specifies 45 paper sheets, the item "duplex" specifies the duplex printing function available, and the item "stapling" specifies the stapling function unavailable.

FIG. 12 is a diagram showing an example of the flow of transmission processing. The transmission processing is processing executed in step S37 shown in FIG. 37. Referring to FIGS. 12 and 10, CPU 101 of MFP 100 judges whether all the processing defined by the processing procedure is included in executable processing in the capacity information (step S41). In other words, CPU 101 judges whether the processing defined by the processing procedure is executable by destination apparatus MFP 100A. When all the processing defined by the processing procedure is included in executable processing in the capacity information, the processing proceeds to step S42, and otherwise, the processing proceeds to step S45.

In step S42, CPU 101 judges whether the processing defined by the processing procedure is restricted by the individual restriction information. In other words, CPU 101 judges whether execution of the processing defined by the processing procedure, which has been judged to be executable by destination apparatus MFP 100A, is restricted by the individual restriction information of the user specified by the destination specifying information. If the processing defined by the processing procedure is not restricted by the individual restriction information, the processing proceeds to step S43, and if restricted, the processing proceeds to step S45.

In step S43, CPU 101 of MFP 100 transmits the destination specifying information, the image data, and the processing procedure to the destination apparatus. CPU 101 then transmits a total charge to the destination apparatus (step S44), and the processing goes back to the job input processing. The total charge is a charge calculated based on the processing procedure and incurred when the image data is formed into image in accordance with the processing procedure.

Destination apparatus MFP 100A is in a stand-by state until reception of the destination specifying information, the image data, and the processing procedure ("NO" in step S75). Upon reception of the destination specifying information, the image data, and the processing procedure, MFP 100A generates job data that associates the destination specifying information, the image data, and the processing procedure, and stores the job data in HDD 107 along with the destination specifying information, the image data, and the processing procedure (step S76). The job data is associating data that associates the destination specifying information, the image data, and the processing procedure. In the next step S77, MFP 100A judges whether MFP 100A has received charging information. MFP 100A turns into a stand-by state until reception of the charging information ("NO" in step S77). When MFP 100A receives the charging information, the processing proceeds to step S78. In step S78, MFP 100A stores in HDD 107 the received total charge along with the destination specifying information received in step S76. The processing proceeds to step S79 for charging the total charge to the user corresponding to the destination specifying information.

In step S45, transmitting apparatus MFP 100 executes charge calculation processing. The charge calculation processing, which will be described in detail later, is processing that determines the processing executable by the destination apparatus as executable processing, and that calculates a restriction charge and a charge difference between the total charge and the restriction charge.

In the next step S46, the charging information is displayed. CPU 101 of MFP 100 displays on display portion 119B a charging information display window including the charging information. The charging information display window displays the total charge and the charge difference. The restriction charge can also be displayed. The restriction charge is a charge incurred when executable processing determined in step S61 shown in FIG. 13, described later, is executed.

FIG. 13 is a flowchart showing an example of the flow of charge calculation processing. Referring to FIG. 13, CPU 101 of MFP 100 determines processing executable by the destination apparatus among the processing defined by the processing procedure, with the use of the capacity information of the destination apparatus and the individual restriction information of the user corresponding to the destination specifying information (step S61). Here the parameter "in color" is set as the color type, the parameter "A3" is set as the sheet size, and the parameter "600 dpi" as resolution. For the capacity information of destination apparatus MFP 100A, the item "color type" is set for "in monochrome," as shown in FIG. 11, and therefore MFP 100A cannot follow a processing procedure that sets the parameter "in color" as the item "color type." Thus, the color type of the executable processing is determined on "in monochrome." For the capacity information of destination apparatus MFP 100A, the item "resolution" is set for 300 dpi, and therefore MFP 100A cannot follow a processing procedure that sets the parameter "600 dpi" as resolution. Thus, the resolution of the executable processing is determined on "300 dpi."

In a similar manner, processing, among the processing set in the processing procedure, that is restricted by the individual restriction information of the user specified by the destination specifying information is determined as processing executable by the destination apparatus within the range of the individual restriction information. In the next step S62, CPU 101 of MFP 100 calculates a restriction charge. This charge is calculated by referring to a charge table stored in advance in HDD 107. Determining the executable processing enables it to calculate the charge based on the processing that is actually executable by the destination apparatus. This in turn enables accurate charge calculation and accurate charging.

Then, CPU 101 of MFP 100 calculates the total charge (step S63). The total charge is a charge incurred when an image is formed by executing the processing set in the processing procedure. Next, CPU 101 calculates the difference between the total charge and the restriction charge (step S64), and the processing goes back to the transmission processing.

FIG. 14 is a diagram showing an example of the charge table. The charge table defines 20 yens for the charge of monochrome printing of A5 or B5 paper sheets and 30 yens for the charge of color printing of A5 or B5 paper sheets, 30 yens for the charge of monochrome printing of A4 or B4 paper sheets and 50 yens for the charge of color printing of A4 or B4 paper sheets, and 50 yens for the charge of monochrome printing of A3 paper sheets and 80 yens for color printing of A3 paper sheets.

FIG. 15 is a diagram showing an example of the charging information display window. Referring to FIG. 15, the charging information display window includes an area for displaying the processing procedure, an area for displaying the executable processing, an area for displaying the total charge, an area for displaying the charge difference, a button with the word "OK," and a button with the word "Cancel." The area for displaying the processing procedure is identified by the caption "Recommended Condition," and the area for displaying the executable processing is identified by the caption "Receiving End." The total charge displayed here is 80 yens, which is the case of color printing for the color type and A3 for the sheet size. The restriction charge displayed here is 30 yens in the case of monochrome printing for the color type and A4 for the sheet size, resulting in 50 yens displayed as the charge difference. By taking a look at the charging information display window, the transmitting user, who corresponds to the user identification information "David" here, is informed that the image data is not formed into image in accordance with the processing set in the processing procedure.

The button with the word "OK" is used by the transmitting user, who corresponds to the user identification information "David" here, to make an instruction of agreement and permission to the formation of an image in accordance with the executable processing instead of the processing set in the processing procedure. The button with the word "Cancel" is a button to make an instruction of the user's disagreement and disallowance to the execution of the executable processing. When the user makes an instruction on the button with the word "OK," CPU 101 accepts the user's permission. When the user makes an instruction on the button with the word "Cancel," the CPU 101 accepts the user's disallowance.

Referring again to FIGS. 12 and 10, in step S47, CPU 101 of MFP 100 judges whether an instruction has been made on the button with the word "OK," which is displayed on the charging information display window, and thus a permission has been accepted. If a permission is accepted, the processing proceeds to step S48, and if a disallowance is accepted, the processing goes back to the job input processing (shown in FIG. 9). When accepting a disallowance, the CPU 101 can discontinue transmitting the image data, thereby preventing the image data from being formed into image in accordance with the executable processing.

In step S48, CPU 101 stores the user identification information of the transmitting user and the charge difference. This is for the purpose of charging the charge difference to the transmitting user. In step S49, CPU 101 transmits the destination specifying information, the image data, and the processing procedure to the destination apparatus. CPU 101 then transmits the restriction charge to the destination apparatus (step S50). This is for the purpose of charging the charge difference to the user specified by the destination specifying information.

Destination apparatus MFP 100A is in a stand-by state until reception of the destination specifying information, the image data, and the processing procedure ("NO" in step S75). Upon reception of the destination specifying information, the image data, and the processing procedure, MFP 100A generates job data associating the destination specifying information, the image data, and the processing procedure, and stores the job data in HDD 107 along with the destination specifying information, the image data, and the processing procedure (step S76). The job data is associating data that associates the destination specifying information, the image data, and the processing procedure.

In the next step S77, MFP 100A judges whether MFP 100A has received the charging information. MFP 100A turns into a stand-by state until reception of the charging information ("NO" in step S77). When MFP 100A receives the charging information, the processing proceeds step S78. Here MFP 100A receives restriction information as the charging information. In step S78, MFP 100A stores the received restriction information and the destination specifying information in HDD 107, and the processing proceeds to step S79. This is for the purpose of charging the restriction charge to the user specified by the destination specifying information.

Next, when the user specified by the destination specifying information, who corresponds to the user identification information "Julie" here, carries out an operation to log in MFP 100A, then MFP 100A carries out user authentication (step S79). When, as a result of the user authentication, the authentication is successful, then log-in is admitted for the user and the processing proceeds to step S80. When the authentication is unsuccessful, log-in is denied for the user and the job control processing is terminated. In step S80, MFP 100A judges whether there is job data addressed to the log-in user. Specifically, MFP 100A judges whether HDD 107 stores job data including the user identification information "Julie," which corresponds to the user who has been admitted log-in. When such job data is stored, the processing proceeds to step S81, and otherwise, the job control processing is terminated.

In step S81, in accordance with the processing procedure, the MFP 100A forms into image the image data that is associated with the user identification information of the log-in admitted user by the job data including the user identification information "Julie." When such processing is defined that cannot be executed in accordance with the processing procedure, MFP 100A forms the image data into image in accordance with the executable processing.

After image forming is completed, MFP 100A reads charging information stored in HDD 107 in association with the user identification information of the log-in admitted user. The charging information is the restriction charge or the total charge. When an image is formed in accordance with the executable processing, the restriction charge is employed.

In the next step S83, MFP 100A charges an amount of money defined by the charging information to the log-in admitted user. Since the charging is carried out after an image is actually formed, matching can be carried out between the printing results and the amount of money charged, resulting in accurate charging. In the charging, printing results stored in a counter for each user stored in destination apparatus MFP 100A are counted up. When charge information is controlled in a charge control server connected to MFP 100A via network 2, MFP 100A transmits to the charge control server the user identification information and the charging information, and the charge control server counts up charges against the user identification information. In the next step S84, MFP 100A transmits an output completion notification to transmitting apparatus MFP 100.

Referring to FIG. 12, transmitting apparatus MFP 100 is in a stand-by state until reception of the output completion notification ("NO" in step S51). When MFP 100 receives the output completion notification, the processing proceeds to step S52. In step S52, MFP 100 reads the user identification information of the transmitting apparatus and the charge difference that are previously stored in HDD 107 in step S48, and charges the charge difference to the user specified by the transmitting source, who is "David" here (step S52), and the processing goes back to the job input processing (shown in FIG. 9). Since the charging is carried out after receiving the output completion notification, which is received after an image is actually formed, matching can be carried out between the printing records and the amount of money charged, resulting in accurate charging.

In the charging, counters for printing results for the users stored in transmitting apparatus MFP 100 are counted up. When charge information is controlled in a charge control server connected to MFP 100 via network 2, MFP 100 transmits to the charge control server the user identification information and the charging information, and the charge control server counts up charges against the user identification information. The charge difference of the total charge is charged to the transmitting user, and the restriction charge of the total charge is charged to the user specified by the destination specifying information. Thus, the charges are divided in a proper manner and distributed to the transmitting user and the destination user.

While in the first embodiment the restriction charge is charged to the user specified by the destination specifying information, it is also possible to charge the total charge, including the restriction charge, to the transmitting user. In this case, the processing of charging the total charge to the transmitting use is executed instead of step S44 shown in FIG. 12. Also, in step S52, the processing of charging the total charge to the transmitting user is executed, without executing step 77. Steps S77 and S78 shown in FIG. 10 are unnecessary.

Second Embodiment

In charging system 1 in the first embodiment, the charge difference is calculated by transmitting apparatus MFP 100. In a charging system 1 in a second embodiment, the charge difference is calculated by destination apparatus MFP 100A. Charging system 1 in the second embodiment is otherwise configured in the same manner as the charging system in the first embodiment, and description will be made mainly of different points.

Figure 16:
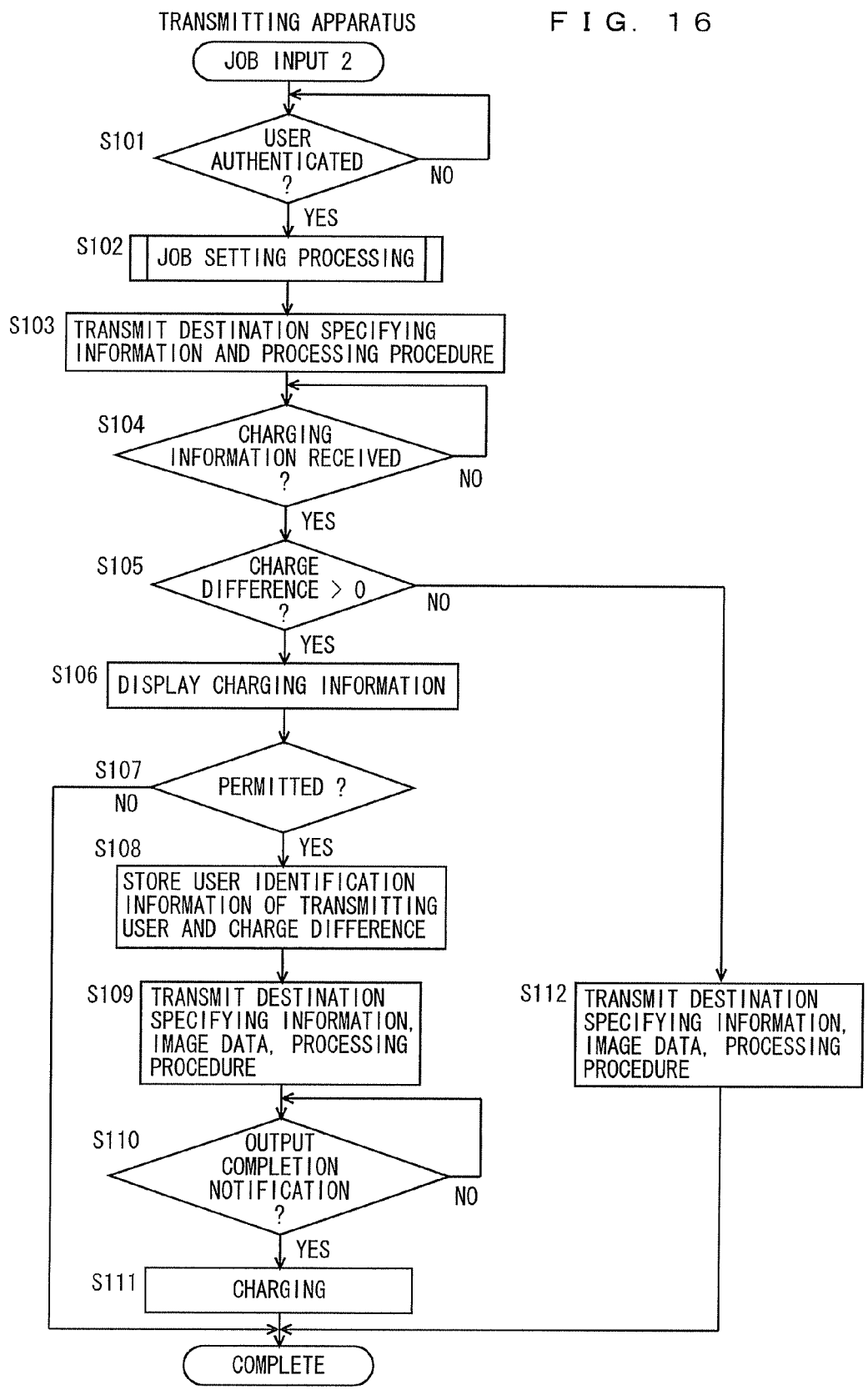
FIG. 16 is a second flowchart showing an example of the flow of job input processing executed by the transmitting apparatus.
Figure 17:
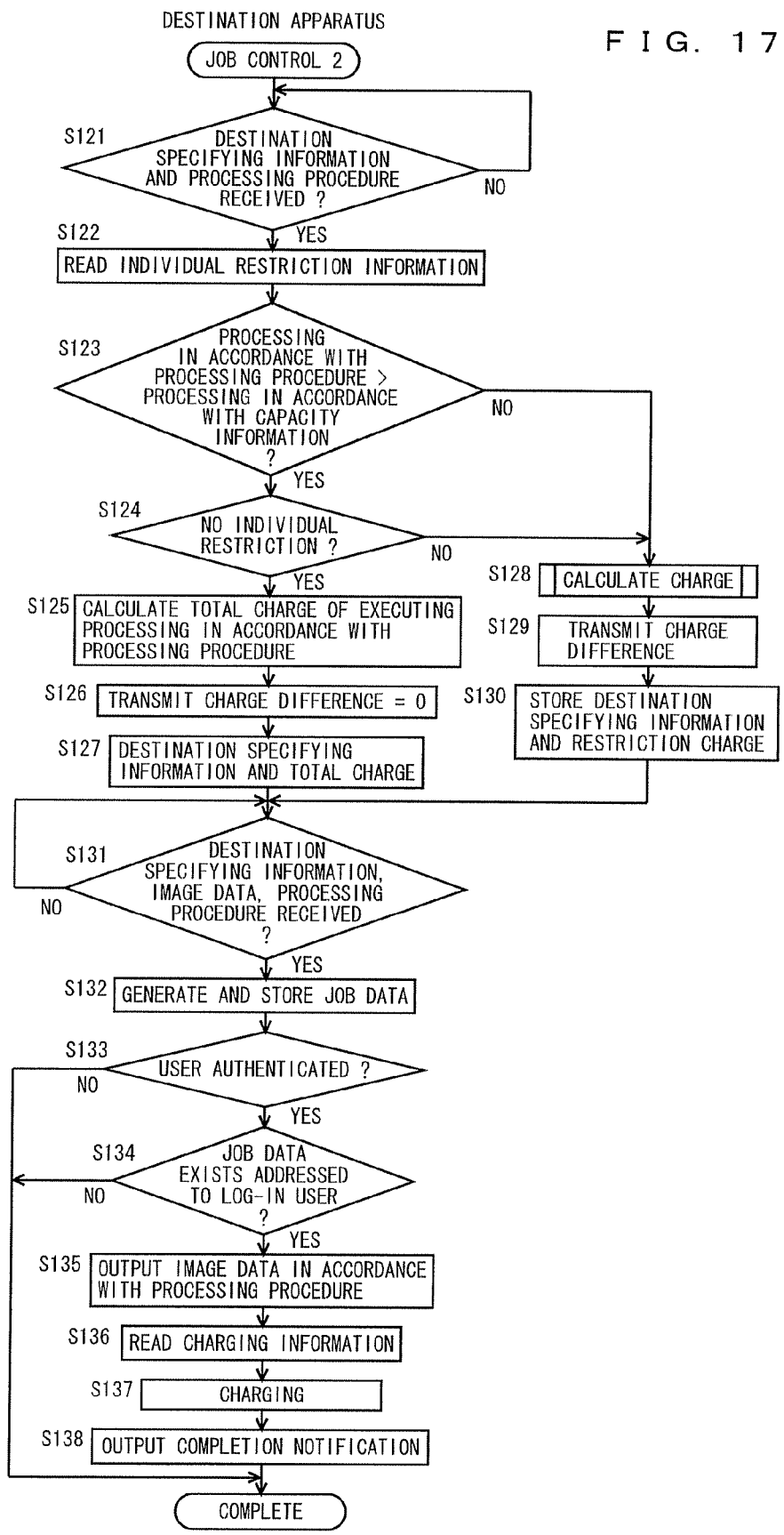
FIG. 17 is a second flowchart showing an example of the flow of job control processing executed by the destination apparatus.

FIG. 16 is a second flowchart showing an example of the flow of the job input processing executed by the transmitting apparatus. FIG. 17 is a second flowchart showing an example of the flow of the job control processing executed by the destination apparatus.

Referring to FIGS. 16 and 17, MFP 100, which is a job input apparatus here, executes user authentication of the user who corresponds to the user identification information "David" (step S101). When, as a result of the user authentication, the authentication is successful, then log-in is admitted for the user and the processing proceeds to step S102. When the authentication is unsuccessful, log-in is denied for the user and the processing goes back to step S101, with MFP 100 turning into a stand-by state.

In step S102, CPU 101 of MFP 100 executes the job setting processing described referring to FIG. 6. After completion of the job setting, the processing proceeds to step S103. Upon completion of the job setting processing, image data to be transmitted, destination specifying information (user identification information) and destination apparatus (apparatus identification information), which are the destination of the image data, and a processing procedure are determined.

In step S103, CPU 101 transmits the destination specifying information and the processing procedure to the destination apparatus. This is for the purpose of confirming whether the image data can be formed into image by the destination apparatus in accordance with the processing procedure. Next, CPU 101 turns into a stand-by state until reception of charging information from the destination information ("NO" in step S104).

MFP 100A, which is a destination apparatus here, is in a stand-by state until reception of the destination specifying information and the processing procedure ("NO" in step S121). When MFP 100A receives the destination specifying information and the processing procedure, the processing proceeds to step S122 ("YES" in step S121). In step S122, the CPU 101 of MFP 100A reads individual restriction information stored in HDD 107. Then, CPU 101 of MFP 100A judges whether all the processing defined by the processing procedure is included in processing that is set as executable in the capacity information of MFP 100A (step S123). In other words, CPU 101 judges whether destination apparatus MFP 100A is able to execute processing defined by the processing procedure. When all the processing defined by the processing procedure is included in processing that is set as executable in the capacity information, then the processing proceeds to step S124, and otherwise, the processing proceeds to step S128.

In step S124, CPU 101 judges whether the processing defined by the processing procedure is restricted by the individual restriction information. In other words, CPU 101 judges whether execution of the processing defined by the processing procedure, which has been judged to be executable by destination apparatus MFP 100A, is restricted by the individual restriction information of the user specified by the destination specifying information. If the processing defined by the processing procedure is not restricted by the individual restriction information, the processing proceeds to step S125, and if restricted, the processing proceeds to step S128.

In step S125, CPU 101 calculates a total charge, and the processing proceeds to step S126. In step S126, CPU 101 of MFP 100A transmits to transmitting apparatus MFP 100 charging information including a charge difference set at the value 0. CPU 101 then stores in HDD 107 the received destination specifying information and the total charge (step S127), and the processing proceeds to step S131. This is for the purpose of charging the total charge to the user specified by the destination specifying information.

In step S128, CPU 101 of MFP 100A executes the charge calculation processing shown in FIG. 13 to calculate the total charge, the restriction charge, and a charge difference. Next, CPU 101 of MFP 100A transmits to transmitting apparatus 100 charging information including the calculated charge difference (step S129). CPU 101 then stores in HDD 107 the destination specifying information received in step S121 and the restriction charge (step S127), and the processing proceeds to step S131. This is for the purpose of charging the restriction charge to the user specified by the destination specifying information.

In step S104, transmitting apparatus MFP 100 is in a stand-by state until reception of the charging information. When the MFP 100 receives the charging information, the processing proceeds to step S105. In step S105, MFP 100 judges whether the charge difference included in the charging information is larger than 0. When the charge difference is larger than 0, the processing proceeds to step S106, and otherwise, the processing proceeds to step S112.

In step S106, MFP 100 displays the charging information. Specifically, CPU 101 of MFP 100 displays on display portion 119B the charging information display window including the charging information shown in FIG. 15. In the next step S107, MFP 100 judges whether an instruction has been made on the button with the word "OK," which is on the charging information display window, and thus a permission has been accepted. If a permission is accepted, the processing proceeds to step S108, and if a disallowance is accepted, the processing is terminated. When accepting a disallowance, CPU 101 can discontinue transmitting the image data, thereby preventing the image data from being formed into image in accordance with the executable processing.

In step S108, MFP 100 stores the user identification information of the transmitting user and the charge difference. This is for the purpose of charging the charge difference to the transmitting user. In step S109, MFP 100 transmits to the destination apparatus the destination specifying information, the image data, and the processing procedure.

In the next step S110, MFP 100 is in a stand-by state until reception of an output completion notification from the destination apparatus ("NO" in step S110). When MFP 100 receives an output completion notification, the processing proceeds to step S111. In step S111, MFP 100 reads the user identification information of the transmitting apparatus and the charge difference that are previously stored in HDD 107 in step S108, and charges the charge difference to the user specified by the transmitting source, who is "David" here, and the processing is terminated. In the charging, counters for printing results for the users stored in transmitting apparatus MFP 100 are counted up. When charge information is controlled in a charge control server connected to MFP 100 via network 2, MFP 100 transmits to the charge control server the user identification information and the charging information, and the charge control server counts up charges against the user identification information.

Destination apparatus MFP 100A is in a stand-by state until reception of the destination specifying information, the image data, and the processing procedure ("NO" in step S131). Upon reception of the destination specifying information, the image data, and the processing procedure, MFP 100A generates job data that associates the destination specifying information, the image data, and the processing procedure, and stores the job data in HDD 107 along with the destination specifying information, the image data, and the processing procedure (step S132). The job data is associating data that associates the destination specifying information, the image data, and the processing procedure.

Description of the processing in steps S133 to S138, which is the same as the processing in steps S79 to S84, will not be repeated.

As has been described hereinbefore, in charging system 1 in this embodiment, when transmitting apparatus MFP 100 accepts transmitting source specifying information for identifying transmitting user "David," destination specifying information for identifying user "Julie" as the data destination, and a processing procedure defining processing executed with respect to the data, then MFP 100A, which is the destination apparatus that is associated with the destination specifying information for identifying user "Julie," is determined, and the capacity information of MFP 100A and the individual restriction information of user "Julie" are acquired. Based on the processing procedure, the capacity information, and the individual restriction information, at least either the charging processing of billing transmitting source user "David" or the charging processing of billing user "Julie" is executed. Thus, the user to be billed can be switched between transmitting user "David" and destination user "Julie" depending on whether processing can be executed by the destination apparatus in accordance with the processing procedure.

Also, since a processing procedure, the capacity information of MFP 10A, and the individual restriction information of user "Julie" are acquired, executable processing, among processing executable by destination apparatus MFP 100A, that is permitted to be executed by user "Julie" can be specified. This enables it to calculate a charge based on the executable processing, resulting in an accurate calculation of an amount of money to be charged.

Also, when the determined executable processing includes all the processing defined by the processing procedure, destination user "Julie" is billed. Thus, only the destination can be billed.

Also, when not all the processing defined by the processing procedure is included in the executable processing of destination apparatus MFP 100A, a restriction charge is calculated so that the difference between the total charge and the restriction charge is charged to transmitting user "David" and the restriction charge is charged to destination user "Julie." Thus, the printing charge is charged in a divided manner to the transmitting source and the destination.

Further, since the charging processing is executed after image data is formed into image by destination apparatus MFP 100A, the actual processing can be brought into conformity with the actual amount of money to be charged, resulting in accurate charging.

While the above-described embodiments description has been made of charging system 1, it will be readily appreciated that the present invention can also be taken as a job input method or a job input program embodied on a computer readable medium for causing the transmitting apparatus to execute the processing shown in FIGS. 9, 12, 13, and 16, or as a job control method or a job control program embodied on a computer readable medium for causing the destination apparatus to execute the processing shown in FIG. 10 or FIG. 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charging system comprising:
a transmitting source accepting portion to accept transmitting source specifying information for specifying a transmitting user;
a destination accepting portion to accept destination specifying information for specifying a user as a destination of data;
a specifying portion to accept specifying of the data;
a procedure accepting portion to accept a processing procedure defining processing executed with respect to the specified data;
an apparatus determining portion to acquire apparatus identification information for identifying a destination apparatus corresponding to the destination;
a restriction information acquiring portion to acquire capacity information defining processing executable by the destination apparatus;
a charging portion to determine a predetermined cost for the processing procedure, and to, when the processing defined by the capacity information does not include part of the processing defined by the processing procedure, execute charging processing such that the predetermined cost is charged in a divided manner to the transmitting user and the destination user, wherein the divided manner is determined by taking into consideration both the processing procedure and the processing defined by the capacity information; and
a processor configured to control at least the foregoing portions.

2. The charging system according to claim 1, further comprising a user data storing portion to store user data including a plurality of user records, each of the user records associating user identification information for identifying a user and apparatus identification information for identifying a respective apparatus used by the user, wherein:
said transmitting source accepting portion accepts user identification information from the user records for identifying a user as the transmitting user as the transmitting source specifying information;
said destination accepting portion accepts, as the destination specifying information, another user identification information from the user records for identifying a destination user of the data; and
said apparatus determining portion extracts from the user data the user record defining the destination specifying information and acquires, as the apparatus identification information for identifying the destination apparatus, the apparatus identification information associated with the destination specifying information.

3. The charging system according to claim 2, further comprising:
an associating data generating portion to generate associating data associating the destination specifying information, the specified data, and the processing procedure;
an input portion to accept input of the user identification information;
a data acquiring portion to acquire the data associated with the accepted user identification information by the associating data; and
an executing portion to process the acquired data in accordance with the processing procedure associated with the accepted user identification information by the associating data,
wherein said charging portion executes the charging processing after processing of the data by said executing portion.

4. The charging system according to claim 1, wherein said restriction information acquiring portion further acquires individual restriction information for restricting processing executed in the destination apparatus by the user identified with the destination specifying information.

5. The charging system according to claim 4, further comprising a processing determining portion to determine executable processing, the executable processing being defined by the acquired capacity information and unrestricted by the acquired individual restriction information,
wherein when the determined executable processing includes all the processing defined by the processing procedure, said charging portion executes charging processing such that all processing charge for the data is charged to the destination user.

6. The charging system according to claim 4, further comprising:
- a processing determining portion to determine executable processing, the executable processing being defined by the acquired capacity information and unrestricted by the acquired individual restriction information;
- a restriction-charge calculating portion to, when the determined executable processing does not include part of the processing defined by the processing procedure, calculate a restriction charge for processing of the data in accordance with such a procedure that the processing procedure is restricted within a range of the executable processing; and
- a charge difference calculating portion to calculate a charge difference between a total charge for executing the processing in accordance with the processing procedure and the restriction charge,
- wherein when the determined executable processing does not include part of the processing defined by the processing procedure, said charging portion executes charging processing such that the charge difference is charged to the transmitting user and the restriction charge is charged to the destination user.

7. The charging system according to claim 6, further comprising a charging information display portion to display the charge difference.

8. The charging system according to claim 7, further comprising:
- a data transmitting portion to transmit the specified data to the destination apparatus; and
- a permission accepting portion to accept a transmission permission instruction after the charge difference is displayed,
- wherein said data transmitting portion transmits the data on condition that the transmission permission instruction is accepted.

9. The charging system according to claim 1, further comprising at least two mutually communicable information processing apparatuses including a first information processing apparatus and a second information processing apparatus,
- wherein said charging portion is provided in either said first information processing apparatus or said second information processing apparatus.

10. The charging system according to claim 1, further comprising a data transmitting portion to transmit the specified data to the destination apparatus,
- wherein said charging portion executes the charging processing after transmission of the data by said data transmitting portion.

11. An image processing apparatus comprising:
- a transmitting source accepting portion to accept transmitting source specifying information for specifying a transmitting user;
- a destination accepting portion to accept destination specifying information for specifying a user as a destination of data;
- a specifying portion to accept specifying of the data;
- a procedure accepting portion to accept a processing procedure defining processing executed with respect to the specified data;
- an apparatus determining portion to acquire apparatus identification information for identifying a destination apparatus corresponding to the destination;
- a restriction information acquiring portion to acquire capacity information defining processing executable by the destination apparatus;
- a charging portion to determine a predetermined cost for the processing procedure, and to, when the processing defined by the capacity information does not include part of the processing defined by the processing procedure, execute charging processing such that the predetermined cost is charged in a divided manner to the transmitting user and the destination user, wherein the divided manner is determined by taking into consideration both the processing procedure and the processing defined by the capacity information; and
- a processor configured to control at least the foregoing portions.

12. The image processing apparatus according to claim 11, further comprising a user data storing portion to store user data including a plurality of user records, each of the user records associating user identification information for identifying a user and apparatus identification information for identifying a respective apparatus used by the user, wherein:
- said transmitting source accepting portion accepts user identification information from the user records for identifying a user as the transmitting user as the transmitting source specifying information;
- said destination accepting portion accepts, as the destination specifying information, another user identification information from the user records for identifying a destination user of the data; and
- said apparatus determining portion extracts from the user data the user record defining the destination specifying information and acquires, as the apparatus identification information for identifying the destination apparatus, the apparatus identification information associated with the destination specifying information.

13. The image processing apparatus according to claim 12, further comprising:
- an associating data generating portion to generate associating data associating the destination specifying information, the specified data, and the processing procedure;
- an input portion to accept input of the user identification information;
- a data acquiring portion to acquire the data associated with the accepted user identification information by the associating data; and
- an executing portion to process the acquired data in accordance with the processing procedure associated with the accepted user identification information by the associating data,
- wherein said charging portion executes the charging processing after processing of the data by said executing portion.

14. The image processing apparatus according to claim 11, wherein said restriction information acquiring portion further acquires individual restriction information for restricting processing executed in the destination apparatus by the user identified with the destination specifying information.

15. The image processing apparatus according to claim 14, further comprising a processing determining portion to determine executable processing, the executable processing being defined by the acquired capacity information and unrestricted by the acquired individual restriction information,
- wherein when the determined executable processing includes all the processing defined by the processing procedure, said charging portion executes charging processing such that all processing charge for the data is charged to the destination user.

16. The image processing apparatus according to claim 14, further comprising:
- a processing determining portion to determine executable processing, the executable processing being defined by the acquired capacity information and unrestricted by the acquired individual restriction information;
- a restriction-charge calculating portion to, when the determined executable processing does not include part of the processing defined by the processing procedure, calculate a restriction charge for processing of the data in accordance with such a procedure that the processing procedure is restricted within a range of the executable processing; and
- a charge difference calculating portion to calculate a charge difference between a total charge for executing the processing in accordance with the processing procedure and the restriction charge,
- wherein when the determined executable processing does not include part of the processing defined by the processing procedure, said charging portion executes charging processing such that the charge difference is charged to the transmitting user and the restriction charge is charged to the destination user.

17. The image processing apparatus according to claim 16, further comprising a charging information display portion to display the charge difference.

18. The image processing apparatus according to claim 17, further comprising:
- a data transmitting portion to transmit the specified data to the destination apparatus; and
- a permission accepting portion to accept a transmission permission instruction after the charge difference is displayed,
- wherein said data transmitting portion transmits the data on condition that the transmission permission instruction is accepted.

19. The image processing apparatus according to claim 11, further comprising a data transmitting portion to transmit the specified data to the destination apparatus,
- wherein said charging portion executes the charging processing after transmission of the data by said data transmitting portion.

20. An image processing apparatus comprising:
- a processing procedure receiving portion to receive from a transmitting apparatus a processing procedure defining processing executed with respect to data and destination specifying information for specifying a user as a destination of the data;
- a restriction information acquiring portion to acquire capacity information defining processing executable by said restriction information acquiring portion's own apparatus;
- a charging portion to determine a predetermined cost for the processing procedure, and to, when the processing defined by the capacity information does not include part of the processing defined by the processing procedure, execute charging processing such that the predetermined cost is charged in a divided manner to the transmitting user and the destination user, wherein the divided manner is determined by taking into consideration both the processing procedure and the processing defined by the capacity information; and
- a processor configured to control at least the foregoing portions.

21. A nontransitory computer readable medium having encoded thereon a charging program, said charging program causing a computer to execute the steps of:
- accepting transmitting source specifying information for specifying a transmitting user;
- accepting destination specifying information for specifying a user as a destination of data;
- accepting specifying of the data;
- accepting a processing procedure defining processing executed with respect to the specified data;
- acquiring apparatus identification information for identifying a destination apparatus corresponding to the destination;
- acquiring capacity information defining processing executable by the destination apparatus; and
- executing charging processing for determining a predetermined cost for the processing procedure, such that when the processing defined by the capacity information does not include part of the processing defined by the processing procedure, the predetermined cost is charged in a divided manner to the transmitting user and the destination user, wherein the divided manner is determined by taking into consideration both the processing procedure and the processing defined by the capacity information.

22. A nontransitory computer readable medium having encoded thereon a charging program, said charging program causing a computer to execute the steps of:
- receiving from a transmitting apparatus a processing procedure defining processing executed with respect to data and destination specifying information for specifying a user as a destination of the data;
- acquiring capacity information defining processing executable by an apparatus provided with said computer; and
- executing charging processing for determining a predetermined cost for the processing procedure, such that when the processing defined by the capacity information does not include part of the processing defined by the processing procedure, the predetermined cost is charged in a divided manner to the transmitting user and the destination user, wherein the divided manner is determined by taking into consideration both the processing procedure and the processing defined by the capacity information.

* * * * *